(12) United States Patent
Choi et al.

(10) Patent No.: US 10,637,982 B2
(45) Date of Patent: Apr. 28, 2020

(54) METHOD FOR MANAGING NOTIFICATION RELATING TO APPLICATION AND ELECTRONIC DEVICE THEREFOR

(71) Applicant: Samsung Electronics Co., Ltd., Suwon-si, Gyeonggi-do (KR)

(72) Inventors: Yujin Choi, Suwon-si (KR); Gwiseok Kim, Suwon-si (KR); Byeongkuk Keam, Suwon-si (KR); Kwangseong Choi, Bucheon-si (KR); Won Jin Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/320,326

(22) PCT Filed: Jul. 21, 2017

(86) PCT No.: PCT/KR2017/007867
§ 371 (c)(1),
(2) Date: Jan. 24, 2019

(87) PCT Pub. No.: WO2018/021764
PCT Pub. Date: Feb. 1, 2018

(65) Prior Publication Data
US 2019/0273816 A1  Sep. 5, 2019

(30) Foreign Application Priority Data

Jul. 29, 2016  (KR) .......................... 10-2016-0096821

(51) Int. Cl.
*H04M 1/00* (2006.01)
*H04M 1/725* (2006.01)
(Continued)

(52) U.S. Cl.
CPC ........ *H04M 1/72544* (2013.01); *G06F 3/048* (2013.01); *G06F 3/0481* (2013.01);
(Continued)

(58) Field of Classification Search
CPC .......... H04M 1/72544; H04M 1/72586; G06F 3/048; G06F 3/0481; G06F 3/04812; G06F 3/04817; G06F 9/542; G06F 19/04
See application file for complete search history.

(56) References Cited

U.S. PATENT DOCUMENTS 8,734,255 B2   5/2014  Van Os et al.
9,130,820 B2   9/2015  Lampell et al.
(Continued)

FOREIGN PATENT DOCUMENTS

KR      20100030387 A  *  3/2010
KR   10-2013-0055073 A     5/2013
(Continued)

*Primary Examiner* — Khai M Nguyen
(74) *Attorney, Agent, or Firm* — Jefferson IP Law, LLP

(57) ABSTRACT

Various embodiments of the present invention relate to a method for displaying notifications relating to applications, and an electronic device therefor. An operation method of an electronic device comprises: an operation of displaying at least one execution icon relating to at least one application in a first area; and an operation of, when a notification relating to the at least one application occurs, displaying a notification icon for notifying of the occurrence of the notification in a second area. Other embodiments may be possible.

20 Claims, 25 Drawing Sheets

(51) Int. Cl.
*G06F 3/0481* (2013.01)
*G06F 9/54* (2006.01)
*H04M 19/04* (2006.01)
*G06F 3/048* (2013.01)

(52) U.S. Cl.
CPC ...... *G06F 3/04812* (2013.01); *G06F 3/04817* (2013.01); *G06F 9/542* (2013.01); *H04M 1/72586* (2013.01); *H04M 19/04* (2013.01)

(56) References Cited

U.S. PATENT DOCUMENTS

| | | | |
|---|---|---|---|
| 2013/0047119 A1* | 2/2013 | Lee | G06F 3/04883 715/800 |
| 2013/0104032 A1 | 4/2013 | Lee et al. | |
| 2014/0304616 A1 | 10/2014 | Park et al. | |
| 2014/0351744 A1 | 11/2014 | Jeon et al. | |
| 2015/0149180 A1 | 5/2015 | Lee | |
| 2015/0350414 A1* | 12/2015 | Park | G06F 3/0486 715/808 |
| 2015/0370456 A1* | 12/2015 | Kobayashi | A63F 13/23 463/33 |
| 2016/0019045 A1* | 1/2016 | Morishita | G06F 8/65 717/173 |
| 2017/0212631 A1* | 7/2017 | Kim | G06F 3/04883 |
| 2017/0272536 A1 | 9/2017 | Kunjithapatham et al. | |

FOREIGN PATENT DOCUMENTS

| | | |
|---|---|---|
| KR | 10-2014-0027892 A | 3/2014 |
| KR | 10-2014-0137509 A | 12/2014 |
| KR | 10-1472397 B1 | 12/2014 |
| KR | 10-1502016 B1 | 3/2015 |
| KR | 10-1504682 B1 | 3/2015 |
| KR | 10-2015-0060392 A | 6/2015 |
| KR | 10-2015-0136416 A | 12/2015 |

* cited by examiner

METHOD FOR MANAGING NOTIFICATION RELATING TO APPLICATION AND ELECTRONIC DEVICE THEREFOR

CROSS-REFERENCE TO RELATED APPLICATION(S)

This application is a U.S. National Stage application under 35 U.S.C. § 371 of an International application number PCT/KR2017/007867, filed on Jul. 21, 2017, which is based on and claimed priority of a Korean patent application number 10-2016-0096821, filed on Jul. 29, 2016, in the Korean Intellectual Property Office, the disclosure of which is incorporated by reference herein in its entirety.

TECHNICAL FIELD

Various embodiments of the present disclosure are for managing notifications regarding applications by an electronic device.

BACKGROUND ART

In line with the gradually improving performance of portable electronic devices such as smartphones, various services are provided through electronic devices. Specifically, service areas are expanding from basic services including telephone communication and text message transmission to more complicated services including gaming, messaging, document editing, and still/moving image playback and editing. Moreover, users can add a desired service by adding the corresponding application.

Most applications have a notification function. The notification function is an additional function for delivering information regarding applications to users, and notifies the user of an update of an application or informs the user of a condition change relating to an application or contents provided through the application. The more applications used, the larger the number of notifications provided to the user. In general, applications such as games, in particular, frequently generate notifications.

Even when a large number of notifications occur, users may not be interested in all notifications. Alternatively, the degree of interest of users in each application may differ depending on the content of the notification or on the related application.

DETAILED DESCRIPTION OF THE INVENTION

Technical Problem

Various embodiments of the present disclosure provide a method for managing notifications regarding applications and an electronic device therefor.

Various embodiments of the present disclosure provide a method for managing notifications regarding a specific type of applications by an electronic device, and an electronic device therefor.

Various embodiments of the present disclosure provide a method for categorizing notifications regarding applications by an electronic device, and an electronic device therefor.

Various embodiments of the present disclosure provide a method for categorizing notifications regarding applications by an electronic device, and an electronic device therefor.

Various embodiments of the present disclosure provide a method for displaying icons regarding applications by an electronic device, and an electronic device therefor.

Various embodiments of the present disclosure provide a method for displaying different types of icons regarding applications by an electronic device, and an electronic device therefor.

Various embodiments of the present disclosure provide a method for generating icons regarding applications by an electronic device, and an electronic device therefor.

Technical Solution

In accordance with various embodiments of the present disclosure, an electronic device operating method includes the operations of: displaying at least one execution icon regarding at least one application in a first area; and displaying a notification icon in a second area, when a notification regarding the at least one application occurs, so as to notify of occurrence of the notification.

In accordance with various embodiments of the present disclosure, an electronic device operating method includes the operations of: executing an application; capturing at least one screen among screens displayed while the application is executed; generating an execution icon of the application on the basis of the at least one screen; and controlling the display so as to display the execution icon.

In accordance with various embodiments of the present disclosure, an electronic device includes a display and a processor. The processor is configured to control the display so as to display at least one execution icon regarding at least one application in a first area, and is configured to control the display so as to display a notification icon in a second area, when a notification regarding the at least one application occurs, so as to notify of occurrence of the notification.

In accordance with various embodiments of the present disclosure, an electronic device includes a display and a processor. The processor is configured to execute an application, to capture at least one screen among screens displayed while the application is executed, to generate an execution icon of the application on the basis of the at least one screen, and to control the display so as to display the execution icon.

Advantageous Effects

A method and an electronic device therefor, according to various embodiments, display execution icons and notification icons regarding applications and assign a visual effect thereto on the basis of effective information such that a more intuitive and useful interface related to notifications can be provided.

MODE FOR CARRYING OUT THE INVENTION

Figure 1:
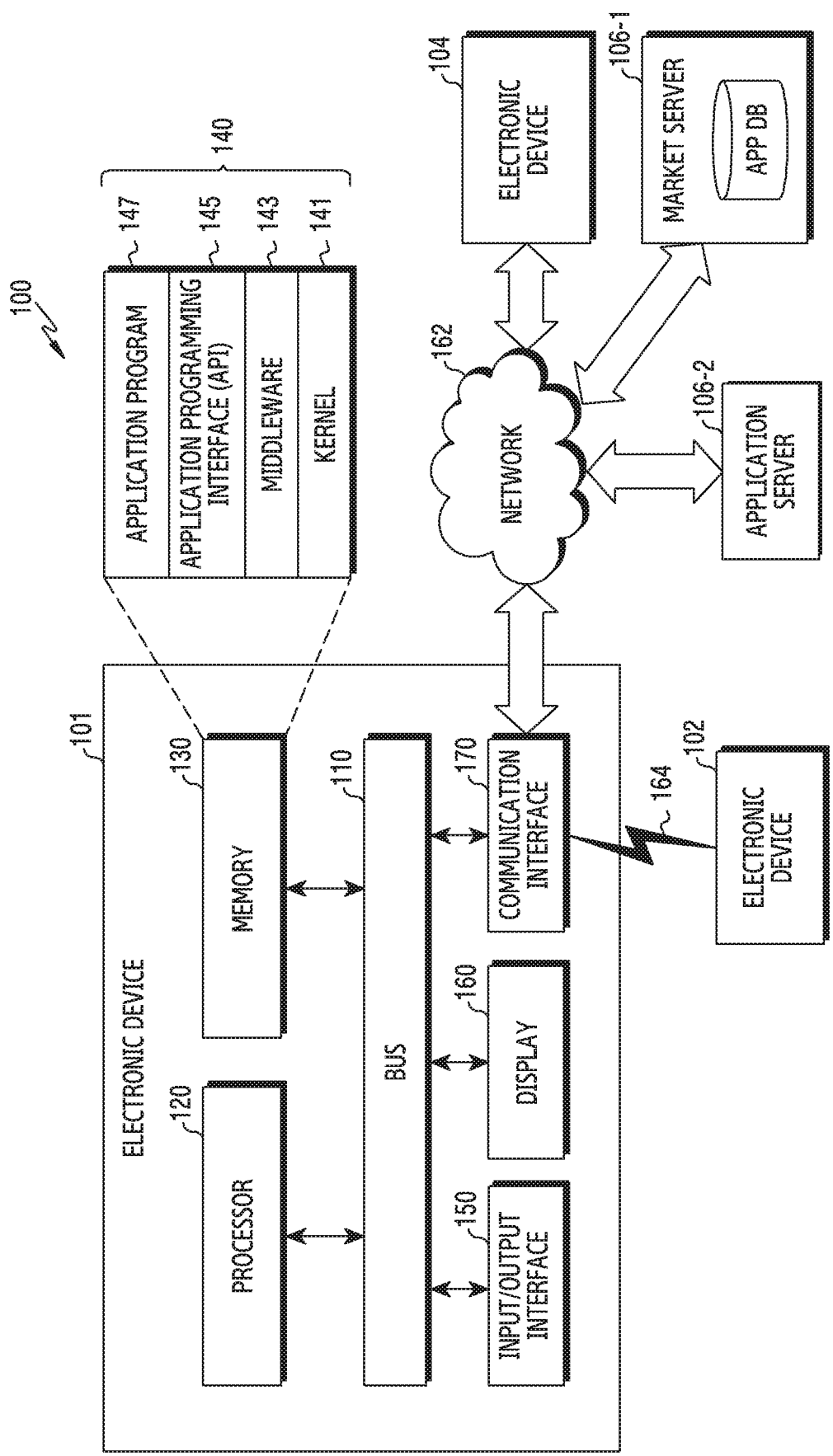
FIG. 1 illustrates an electronic device inside a network environment according to various embodiments of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, market server 106-1, application server 106-2). For example, the communication interface 170 can communicate with the external device (e.g., the second external electronic device 104, market server 106-1, application server 106-2) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 may be the same type of device as the electronic device 101 or a different type of device therefrom. According to various embodiments, all or part of operations executed by the electronic device 101 may be executed by one or multiple different electronic devices (for example, the electronic devices 102 and 104, the market server 106-1, the application server 106-2, or a separate server). According to an embodiment, when the electronic device 101 needs to perform a certain function or service automatically or at a request, the electronic device 101 may request a different device (for example, the electronic devices 102 and 104, the market server 106-1, the application server 106-2, or a separate server 106 (not illustrated)) to execute at least a partial function related thereto, instead of or in addition to executing the function or service by the electronic device 101 itself The different electronic device (for example, the electronic devices 102 and 104, the market server 106-1, the application server 106-2, or a separate server) may execute the requested function or additional function and may deliver the result to the electronic device 101. The electronic device 101 may provide the requested function or service by using the received result with no change or by additionally processing the same. To this end, cloud computing, distributed computing, or client-server computing technology may be used, for example.

The market server 106-1 provides an application that can be installed in the electronic device 101. For example, the market server 106-1 may provide various applications related to gaming, document editing, image editing, coupling providing, and shopping. To this end, the market server 106-1 may include a database regarding applications. The database may include the package name of applications, market category information, and the like. The electronic device 101 may download an application from the market server 106-1 through the network 162.

The application server 106-2 provides contents through an application executed by the electronic device 101. The application server 106-2 may be administered by a content provider. For example, in the case of a game application, the application server 106-2 may function as a game server that stores game account information, game setting data, and the like. In addition, the application server 106-2 may transmit a notification regarding the corresponding application to the electronic device 101. The electronic device 101 may check additional information regarding the application from the application server 106-2 through the network 162.

Figure 2:
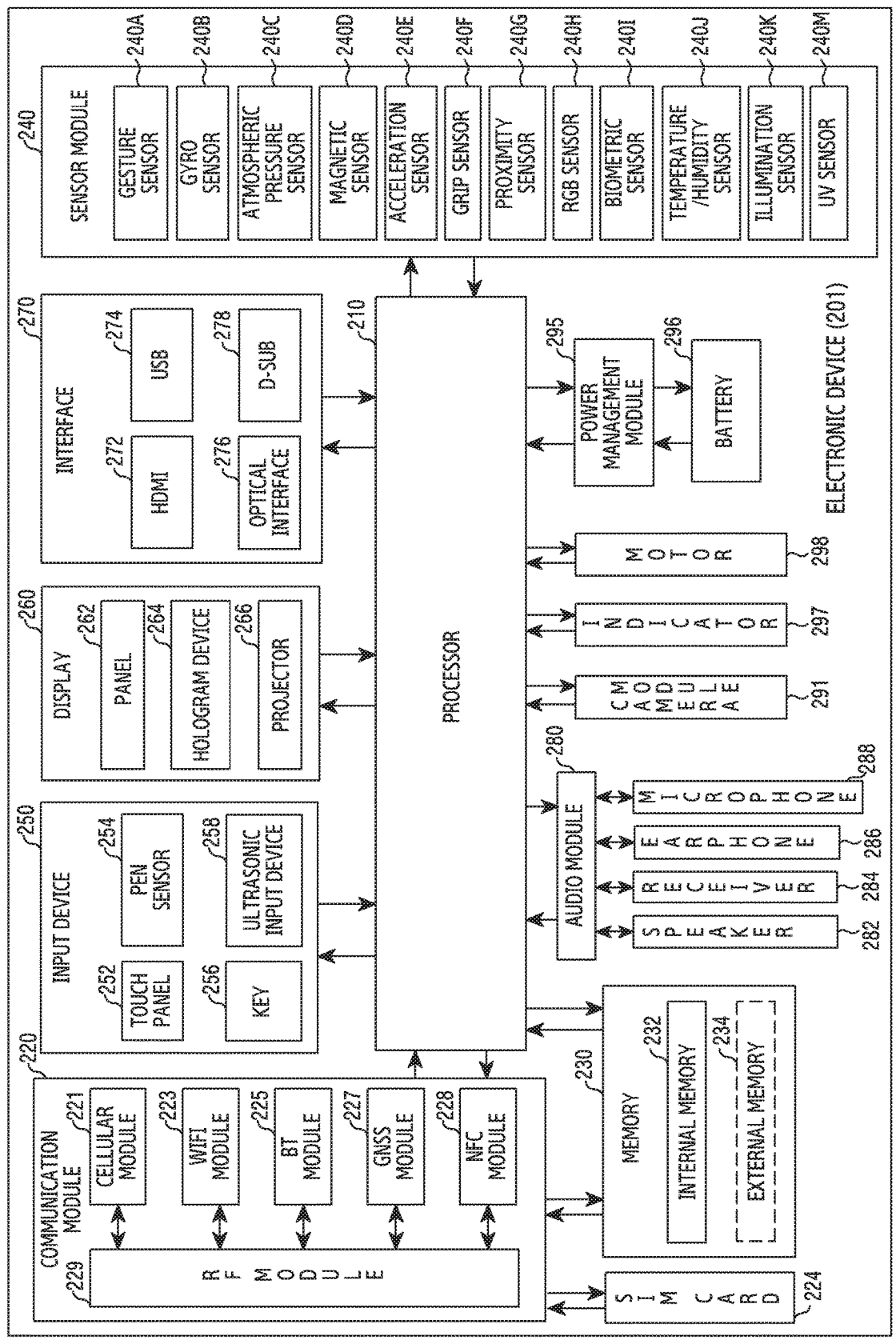
FIG. 2 is a block diagram of an electronic device according to various embodiments of the present disclosure.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 2401, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
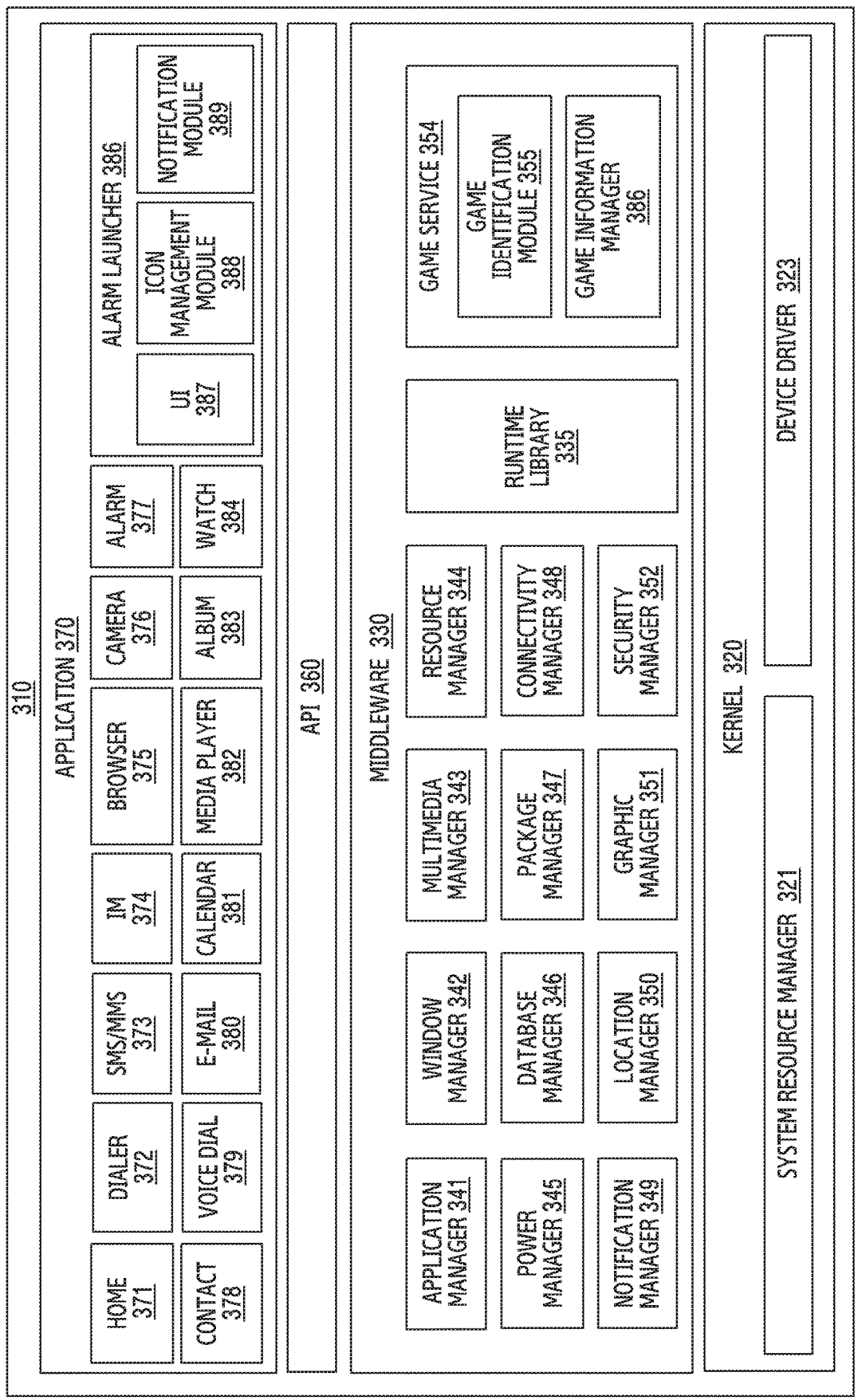
FIG. 3 is a block diagram of a program module according to various embodiments of the present disclosure.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, market server 106-1, application server 106-2).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352, game service 354.

The runtime library 335 can include, for example, a library module used by a complier to add a new function through a programming language while the application 370 is running The runtime library 335 can manage input/output, manage memory, or arithmetic function processing. The application manager 341, for example, can manage the life cycle of the applications 370. The window manager 342 can manage a GUI (graphic user interface) resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication.

The game service 354, for example, can manage game application. In detail, the game service 354 can include game identification module 355 and game information manager 356. The game identification module 355 can identify, when application is installed through market server 106-1, whether or not the application is game. For example, when information about application, or another application requests to identify whether or not a specific application is game, the game identification module 355 can access the market server 106-1 to identify information of application. Or, the game identification module 355 can receive periodically information about whether application installed in the electronic device is game. The game identification module 355 can identify whether application is game using information of the installed application. For example, the game identification module 355 can use package name of application, category information of market from which application is downloaded.

The game information manager 356 can manage information on game application identified by the game identification module 355. For example, the game information manager 356 can control the memory to store information on frequency of execution, play time, memory consumption, place, battery consumption.

The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application, notification launcher 386. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Notification launcher 386 can include user interface 387, icon management module 386, notification module 389. User interface 387 can provide function for displaying data generated by icon management module 388 and notification module 389. Icon management module 388 can provide functions for generating icon for application based execution screen of application, and managing the icon. The notification module 389 can provide function re-process notifications for application.

A term "module" used in the present document includes a unit consisting of hardware, software, or firmware, and may be interchangeably used with a term such as a unit, a logic, a logical block, a component, a circuit, and the like. The "module" may be an integrally constructed component or a minimum unit or one part thereof for performing one or more functions. The "module" may be mechanically or electrically implemented, and may include, for example, an Application-Specific Integrated Circuit (ASIC) chip, a Field-Programmable Gate Arrays (FPGAs), or a programmable-logic device, which is known or to be developed to perform certain operations. At least one part of an apparatus (e.g., modules or functions thereof) or method (e.g., operations) according to various exemplary embodiments may be implemented with an instruction stored in a computer-readable storage media (e.g., the memory 130). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. The module or programming module according to various exemplary embodiments may further include at least one or more constitutional elements among the aforementioned constitutional elements, or may omit some of them, or may further include additional other constitutional elements. Operations performed by a module, programming module, or other constitutional elements may be executed in a sequential, parallel, repetitive, or heuristic manner. In addition, some of the operations may be executed in a different order or may be omitted, or other operations may be added.

On the basis of the structure of the electronic device 101 described above, the electronic device 101 according to various embodiments of the present disclosure manages notifications regarding an application. As used herein, the term "management" includes the storing, deleting, parsing, categorizing, and displaying of notifications. According to an embodiment, notifications regarding all applications may be managed in an integrated manner Alternatively, according to another embodiment, notifications regarding a specific type of applications may be solely managed. Specifically, notifications regarding a specific type of applications that generate a comparatively large number of notifications may be solely be managed, and notifications of applications related to games, shopping, cards, or coupons may be managed, for example. Therefore, some embodiments will hereinafter be described in connection with exemplary "game" applications for convenience of description. However, various embodiments of the present disclosure may also be applied to other types of applications.

Prior to describing various embodiments, terminology used to describe the present disclosure will now be defined.

A "game" refers to a type of application executed by the electronic device 101. A game is an application for enabling a user to experience a process of accomplishing a given objective according to rules through an interaction between the same and the user. Games can be downloaded from the market server 106-1 and installed accordingly, and may be categorized according to the package name, market category information, or the like. In various embodiments of the present disclosure, a game application denotes every type of application controlled through a launcher. When a game-related notification occurs, the corresponding notification is categorized, parsed, and displayed according to various embodiments of the present disclosure.

A "notification" refers to an interface element for providing a user with information regarding an application. A notification includes at least one selected from the identification mark of an application, the time of occurrence, and the content of the notification. The content of a notification may include particulars regarding the application, particulars regarding contents provided through the application, application-related events, particulars regarding the execution condition of the application, and the like. Notifications are displayed so as to occupy a predetermined area on the screen, and are normally enumerated in a list format. When a displayed notification is selected by touching the same, for example, the corresponding application may be executed, and a page related to the notification is displayed.

A "parsing pattern" refers to a rule defined to parse a notification according to embodiments of the present disclosure. Specifically, a parsing pattern defines which effective information is to be extracted, how a notification is to be categorized with reference to the effective information, and in what manner the categorized notification is to be displayed. According to the technical meaning, a parsing pattern may also be referred to by a different term, such as "parsing rule", "parsing scheme", "parsing standard", or "parsing algorithm".

"Effective information" refers to information used to categorize a notification according to embodiments of the present disclosure. Effective information is extracted from information included in a notification. Effective information may be defined by the user or defined so as to conform to the embodiment. For example, data for generating effective data may include at least one selected from the name of a game, the time elapsed after arrival of a notification, a keyword, the day of the week a notification occurs, a user-designated custom message, event information provided from a content provider (for example, a game manufacturer/distributor), nation-specific holiday information, the total application usage time, the application usage time pattern, and social information. On the basis of the above-described data, effective information may be generated so as to determine the detailed type of an application, the effectiveness of a notification, the importance of the notification, the group to which the notification belongs, correlation between notifications, the need to execute the application, and whether or not the application can be executed. According to the technical meaning, effective meaning may also be referred to by a different term, such as "categorization information" or "reference information".

An "execution icon" refers to an interface element for executing an application. That is, an execution icon is configured such that the corresponding application is executed by selecting the same. According to various embodiments of the present disclosure, the outline of an execution icon is not limited to a square or a circle, but the same may be variously configured to have a rectangular or rhombus outline, for example. An execution icon may also be referred to by a different term, such as "first icon", "primary icon", "first type icon", or "default icon".

A "notification icon" refers to an interface element for providing information regarding a notification of an application. A notification icon is used to display information regarding whether or not a notification is generated, the number of generated notifications, and the like. In addition, a notification icon functions as a command means for viewing a notification. That is, a notification icon is configured such that at least one notification regarding the corresponding application is displayed by selecting the same. In this case, the notification icon may correspond to one application or to multiple applications. A notification icon may also be referred to by a different term such as "second icon", "secondary icon", second type icon", or "additional icon".

A "badge" refers to an interface element added to an icon, and is used to display additional information regarding the corresponding icon. A badge is added so as to occupy a partial area of the corresponding icon, and expresses information through a number, a character, or a color. A badge may also be referred to by a different term such as "additional information" or "sub-icon".

A "visual effect" refers to assignment of a visual element that a user can recognize visually. That is, a visual effect makes it possible to distinguish the corresponding interface constituent element (for example, an icon or a notification) from a different interface constituent element. According to various embodiments of the present disclosure, a visual effect may be assigned to an interface constituent element such as an icon or a notification. Specifically, a visual effect may be defined as a combination of one or at least two selected from underlining, highlighting, a color change, a movement, and addition of an additional constituent element (for example, a badge). Various visual effects may be used for various situations. A visual effect is for distinguishing between interface constituent elements, and may be replaced in such a type that the same can be recognized by a sense other than the visual sense. For example, a visual effect may be replaced with a sound-based type.

Figure 4:
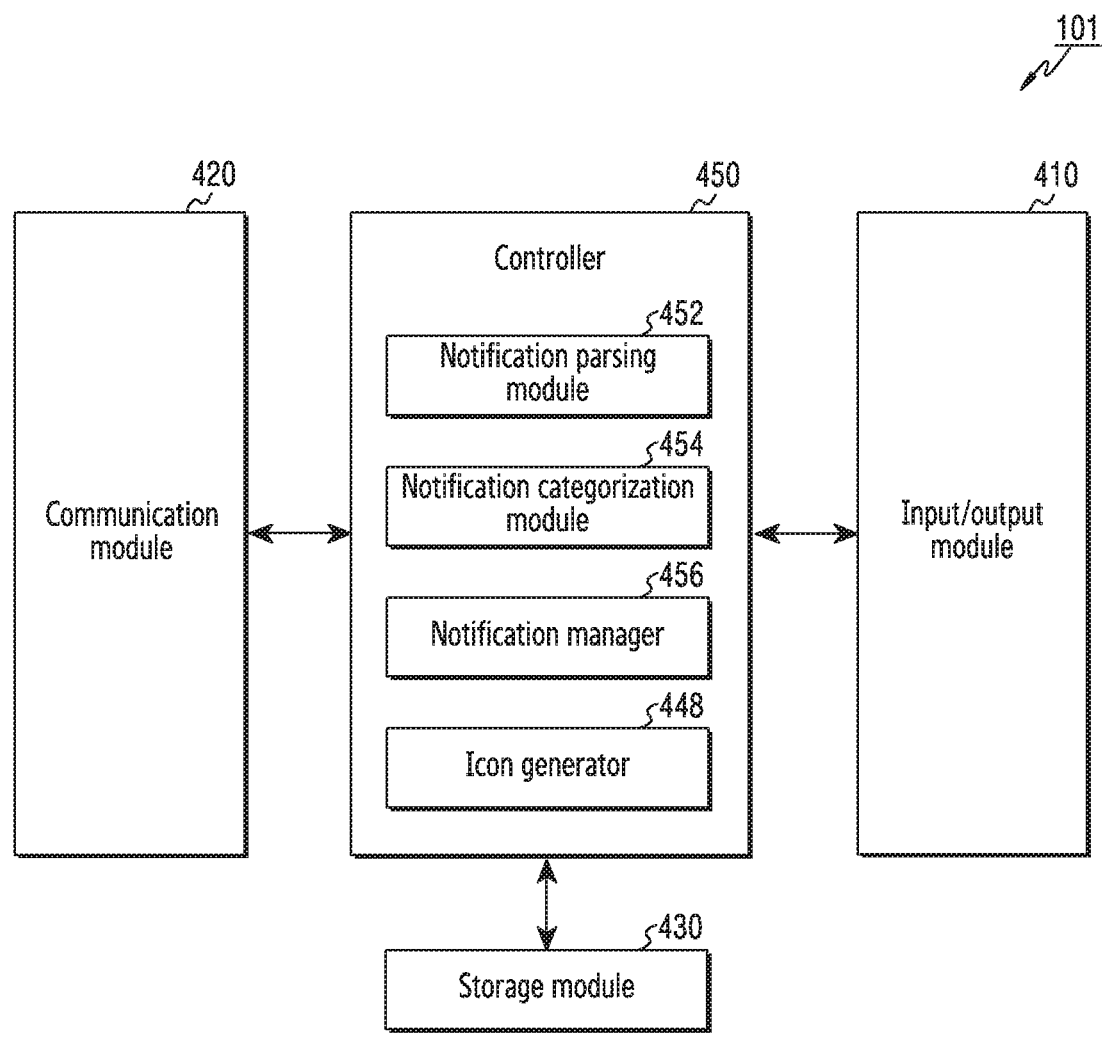
FIG. 4 illustrates a functional configuration of an electronic device according to various embodiments of the present disclosure.

FIG. 4 illustrates a functional configuration of an electronic device 101 according to various embodiments of the present disclosure. As used herein, such a term as " . . . module" or "-er" refers to a unit configured to process at least one function or operation, and may be implemented as hardware, software, or a combination of hardware and software.

Referring to FIG. 4, the electronic device 101 includes an input/output module 410, a communication module 420, a storage module 430, and a controller 450.

The input/output module 410 performs functions for outputting information and sensing inputs from the user or from the outside. The input/output module 410 may deliver a command or data input from the user to the controller 450. To this end, the input/output module 410 may include at least one hardware module for output and input. For example, the input/output module 410 may include all or part of each of the input/output interface 150 and the display 160 illustrated in FIG. 1. In addition, the input/output module 410 may include at least one selected from the input device 250, the display 260, the audio module 280, and the camera module 291 illustrated in FIG. 2.

The communication module 420 performs functions for transmitting/receiving signals to/from an external device. For example, the communication module 420 performs the function of conversion between a baseband signal and a bit string according to the physical layer specification of the system. For example, when data is transmitted through a wireless channel, the communication module 420 encodes and modulates the transmitted beat string, thereby generating complex symbols. In addition, when data is received through a wireless channel, the communication module 420 demodulates and decodes the baseband signal, thereby restoring the received bit string. For example, the communication module 420 may include a transmitting filter, a receiving filter, an amplifier, a mixer, an oscillator, a DAC (digital-to-analog converter), and an ADC (analog-to-digital converter). For example, the communication module 420 may include all or part of the communication interface 170 illustrated in FIG. 1. In addition, the communication module 420 may include all or part of the communication module 220 illustrated in FIG. 2.

The storage module 430 stores data such as a basic program for operation of the electronic device 101, applications, setting information, and user contents. In addition, the storage module 430 provides stored data at the request of the controller 450. For example, the storage module 430 may include all or part of the memory 130 illustrated in FIG. 1. In addition, the storage module 430 may include all or part of the memory 230 illustrated in FIG. 2.

The controller 450 controls the overall operations of the electronic device 101. For example, the controller 450 transmits/receives signals through the communication module 420. In addition, the controller 450 executes an application stored in the storage module 430, records data, and reads data. Particularly, according to various embodiments of the present disclosure, the controller 450 manages notifications regarding applications. To this end, the controller 450 may include a notification parsing module 452, a notification categorization module 454, a notification manager 456, and an icon generator 448. The notification parsing module 452, the notification categorization module 454, the notification manager 456, and the icon generator 448 may be hardware devices configured to perform corresponding functions or sets of instructions stored in the storage module 430 as logical constituent elements.

The notification parsing module 425 parses information included in a notification. For example, the notification parsing module 452 generates effective information necessary for parsing by using the name of the application that has generated the notification, the result of parsing the content of the notification, and the application usage pattern. For example, the notification parsing module 452 may acquire the name of the application through the package of the application that has generated the notification. A parsing pattern for parsing a notification may be delivered through the server or defined by the user. The application usage pattern is stored in the storage module 430. For example, in the case of a game application, the application usage pattern may be accumulated by the game service 354 illustrated in FIG. 3.

The notification categorization module 454 categorizes notifications on the basis of effective information. Categorization based on effective information may be performed variously. The notification categorization module 454 may categorize notifications on the basis of a combination of two or more effective information items. The result of categorizing notifications may exist variously depending on the used effective information.

The notification manager 456 separately stores and manages notifications. The notification manager 456 may manage the content of a notification to be displayed through the input/output module 410 and may store the notification in the storage module 430. In this regard, the data stored in the storage module 430 is data including the notification, or the position value of data including the notification. In addition, the notification manager 456 may delete a stored notification according to the user's input.

The icon generator 448 generates an icon (for example, an execution icon or a notification icon) of an application. In other words, the icon generator 448 generates an image to be mapped to an icon. For example, the icon generator 448 may change the image mapped to the icon to an image such as a recommended image provided by an icon server, a web image obtained on the basis of a search word extracted from package information, an image stored in an internal depository (for example, the storage module 430), an image obtained by screen capture, or an image generated by combining an icon image included in a package with a text. In this regard, the horizontal/vertical ratio of the image may be identical to the ratio of the application execution screen (for example, 16:9). In order to adjust the horizontal/vertical ratio of an image, the obtained image may be changed through a cropping procedure. In addition, an image designated as a representative image by multiple users may be accumulated in a separate server and may be designated as a recommended image.

Hereinafter, various embodiments of the present disclosure will be described with reference to flowcharts and exemplary screen configurations. The electronic device described below as the subject of operation may include the electronic device 101 illustrated in FIG. 1, all or part of the electronic device 201 illustrated in FIG. 2 (for example, the processor 120), and all or part of the electronic device 101 illustrated in FIG. 4 (for example, the controller 450).

Figure 5:
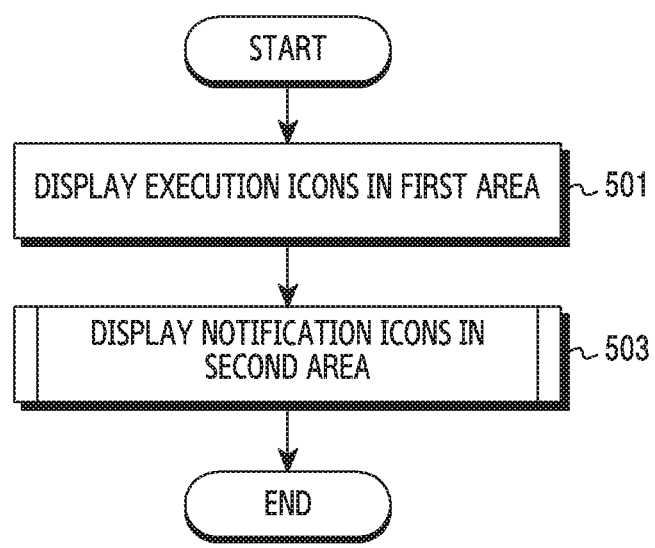
FIG. 5 is a flowchart for displaying icons by an electronic device according to various embodiments of the present disclosure.

FIG. 5 is a flowchart for displaying icons by an electronic device according to various embodiments of the present disclosure. FIG. 5 illustrates an exemplary operating method of an electronic device 101.

Figure 6:
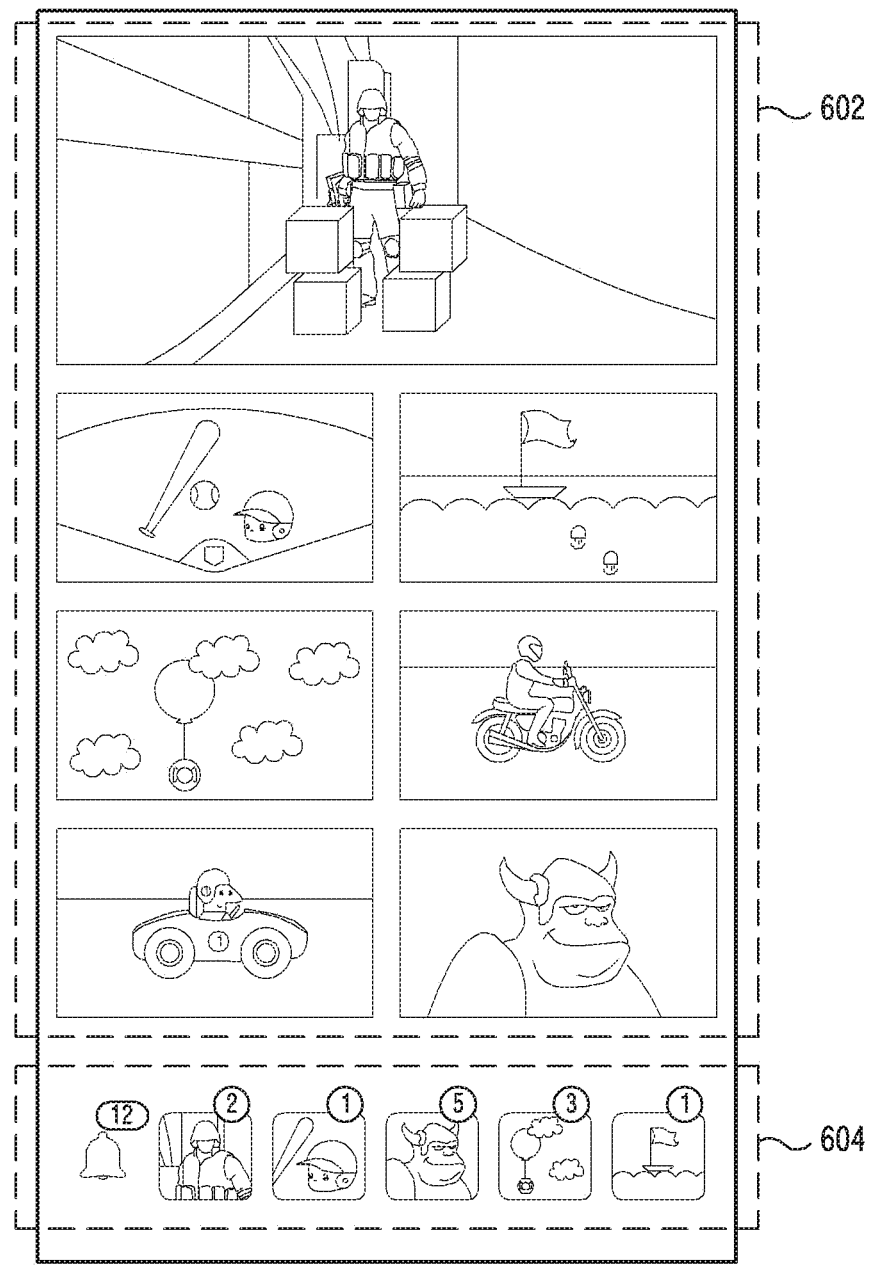
FIG. 6 illustrates an exemplary screen configuration for displaying icons by an electronic device according to various embodiments of the present disclosure.

Referring to FIG. 5, in operation 501, the electronic device displays execution icons in the first area inside the screen. The execution icons may be displayed according to execution of a launcher that manages notifications. Specifically, the processor 120 may check the type of applications managed by the launcher (for example, game applications), may determine the arrangement of execution icons of the checked applications, and may then display the execution icons. For example, the execution icons may be displayed in the first area 602 of the screen configuration as illustrated in FIG. 6. Referring to FIG. 6, execution icons mapped with images related to the corresponding application are displayed in the first area 602, and some of the execution icons may have a size different from that of the remaining icons.

In operation 503, the electronic device displays notification icons in the second area inside the screen. The second area is another part of the screen distinguished from the first area in which execution icons are displayed. For example, notification icons may be displayed in the second area 604 of the screen configuration as illustrated in FIG. 6. Referring to FIG. 6, some of the notification icons displayed in the second area 604 may correspond to two or more applications. In addition, each of the notification icons displayed in the second area 604 may include a badge that indicates the number of notifications. For each notification icon, the number of notifications is indicated by using a badge such that the user can infer the content of the notifications.

According to an embodiment, applications corresponding to notification icons displayed in the second area 604 may be identical to applications corresponding to execution icons displayed in the first area 602. In this case, a notification icon having no notification may be displayed in the second area 604. According to another embodiment, applications corresponding to notification icons displayed in the second area 604 may be independent of applications corresponding to execution icons displayed in the first area 602. For example, a notification icon having at least one notification may solely be displayed in the second area 604.

In the example of screen configuration illustrated in FIG. 6, the order of notification icons displayed in the second area 604 follows a predefined rule. For example, the predefined rule may be defined on the basis of one or a combination of at least two selected from the time when the last notification occurs, the number of notifications, and the order of displaying execution icons. In addition, the order of notification icons may be changed by occurrence of a notification. For example, the order of notification icons may express the order of occurrence of the last notification regarding each application.

In the example of screen configuration illustrated in FIG. 6, when the size of the first area 602 is not sufficient to display all execution icons, the first area 602 may be scrolled. That is, the user may drag the first area 602 such that other execution icons are displayed. In addition, when the size of the second area 604 is not sufficient to display all notification icons, the second area 604 may be scrolled. That is, the user may drag the second area 604 such that other notification icons are displayed.

According to the embodiment described with reference to FIG. 5 and FIG. 6, execution icons and notification icons may be displayed. Accordingly, the user can easily recognize the condition of the application and the condition of notifications regarding the application. In this regard, a notification icon may be newly added or changed when a notification regarding the application occurs. As used herein, a change of a notification icon refers to a change of information displayed through a badge or change of the display position. According to an embodiment, a notification icon may be displayed as will now be described with reference to FIG. 7.

Figure 7:
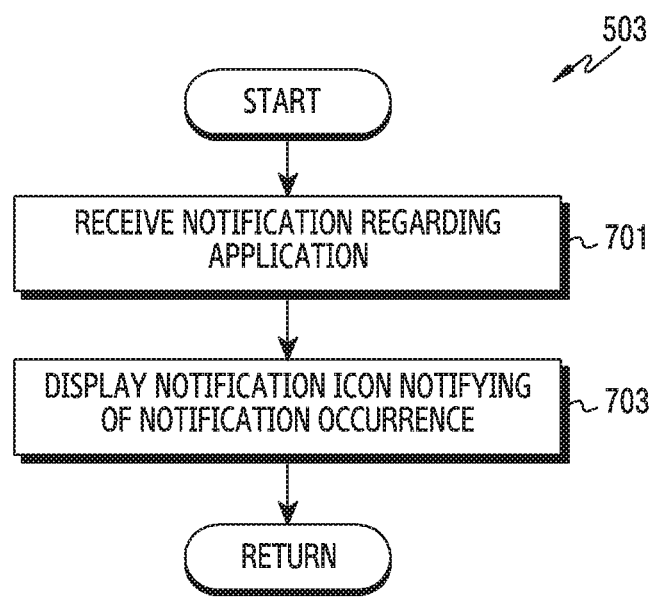
FIG. 7 is a flowchart for displaying notification icons by an electronic device according to various embodiments of the present disclosure.

FIG. 7 is a flowchart for displaying notification icons by an electronic device according to various embodiments of the present disclosure. FIG. 7 illustrates an exemplary operating method of an electronic device 101.

Referring to FIG. 7, in operation 701, the electronic device receives a notification regarding an application. In other words, the processor 120 receives a message including information regarding a notification of one of the applications managed by the launcher through the communication interface 170. That is, the processor 120 senses occurrence of a notification. The message including information regarding a notification may be received from the application server 106-2, and includes information indicating the content of the notification.

Subsequently, in operation 703, the electronic device displays a notification icon that notifies of occurrence of a notification. In this regard, display of a notification icon includes an operation of newly adding a notification icon or changing an already displayed notification icon. Specifically, the processor 120 may add a notification icon regarding an application corresponding to the notification that has occurred to the second area 604 illustrated in FIG. 6, or may modify (for example, increase the number of) information included in the badge of the notification icon regarding the application corresponding to the notification that has occurred. Additionally, the processor 120 may display the notification icon regarding the application corresponding to the notification that has occurred in the position having the highest priority in the second area 604 (for example, the rightmost position, the leftmost position, or the second leftmost position).

In the embodiment described with reference to FIG. 7, when a notification is received, a notification icon is displayed. That is, the embodiment of FIG. 7 does not consider the type of the application corresponding to the notification. However, according to another embodiment, the electronic device may perform operation 703 when the application corresponding to the notification is a designated type of application.

Furthermore, in addition to the procedure of FIG. 7, the electronic device may store a notification. If the value of position in which data including the notification is stored in the memory, that is, the pointer value, is managed separately, the electronic device may solely store the position value. Alternatively, the electronic device may separately store data including the notification. Storing data including the notification or the position value is for the purpose of guaranteeing that, even if the notification is deleted from the notification system provided by the default framework, the same can be managed by the notification launcher 386 according to various embodiments of the present disclosure.

According to the embodiment described with reference to FIG. 7, a notification icon may be displayed. This enables the user to easily recognize which application is related to the notification that has occurred. The notification icon indicates information regarding notification occurrence and, moreover, is an interface element for viewing the notification. That is, information regarding a notification is expressed as an icon, and, when the corresponding icon is selected, that is, when the notification icon is selected, the application is not executed, but notifications are displayed. An exemplary procedure of displaying notifications through a notification icon will now be described with reference to FIG. 8.

Figure 8:
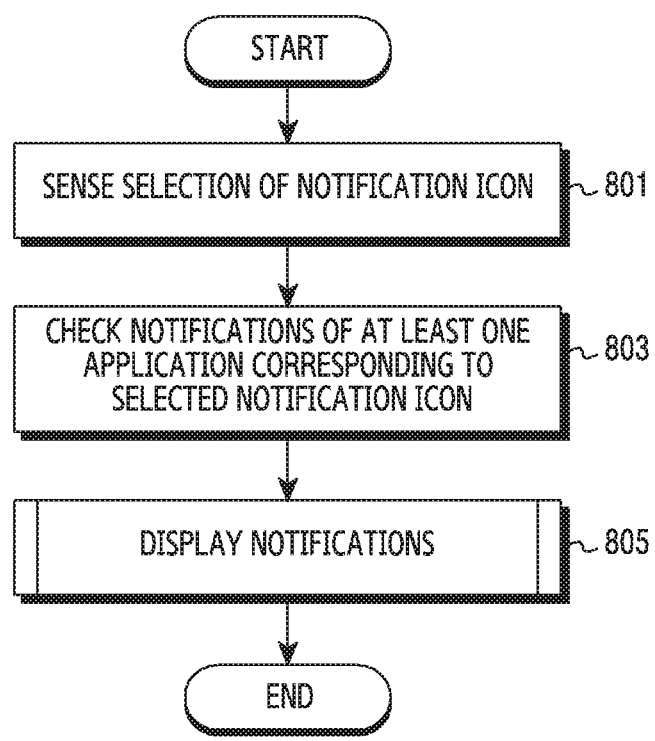
FIG. 8 is a flowchart for displaying notifications by an electronic device according to various embodiments of the present disclosure.

FIG. 8 is a flowchart for displaying notifications by an electronic device according to various embodiments of the present disclosure. FIG. 8 illustrates an exemplary operating method of an electronic device 101.

Referring to FIG. 8, in operation 801, the electronic device senses selection of a notification icon. For example, the processor 120 may sense selection of a notification icon on the basis of a touch input on the touch screen or a voice input. That is, the processor 120 checks selection of one from notification icons displayed in the second area 604 on the screen as illustrated in FIG. 6.

Subsequently, in operation 803, the electronic device checks notifications of at least one application corresponding to the selected notification icon. That is, one notification icon may correspond to one application or to multiple applications. Notifications are stored in the internal depository (for example, the memory 130 or the storage module 430) of the electronic device, and the processor 120 may retrieve the same from the internal depository.

Then, in operation 805, the electronic device displays the checked notifications. Since notification icons are defined to correspond to applications, notifications may also be displayed with regard to respective applications. Notifications may be displayed in the order of time when the same occur with regard to the same application, and may include the title, content, time of occurrence, and the like. Moreover, the processor 120 may assign a predetermined visual effect (for example, underlining, highlighting, color change, movement, or display of additional information) according to parsing of notifications.

Figure 9A:
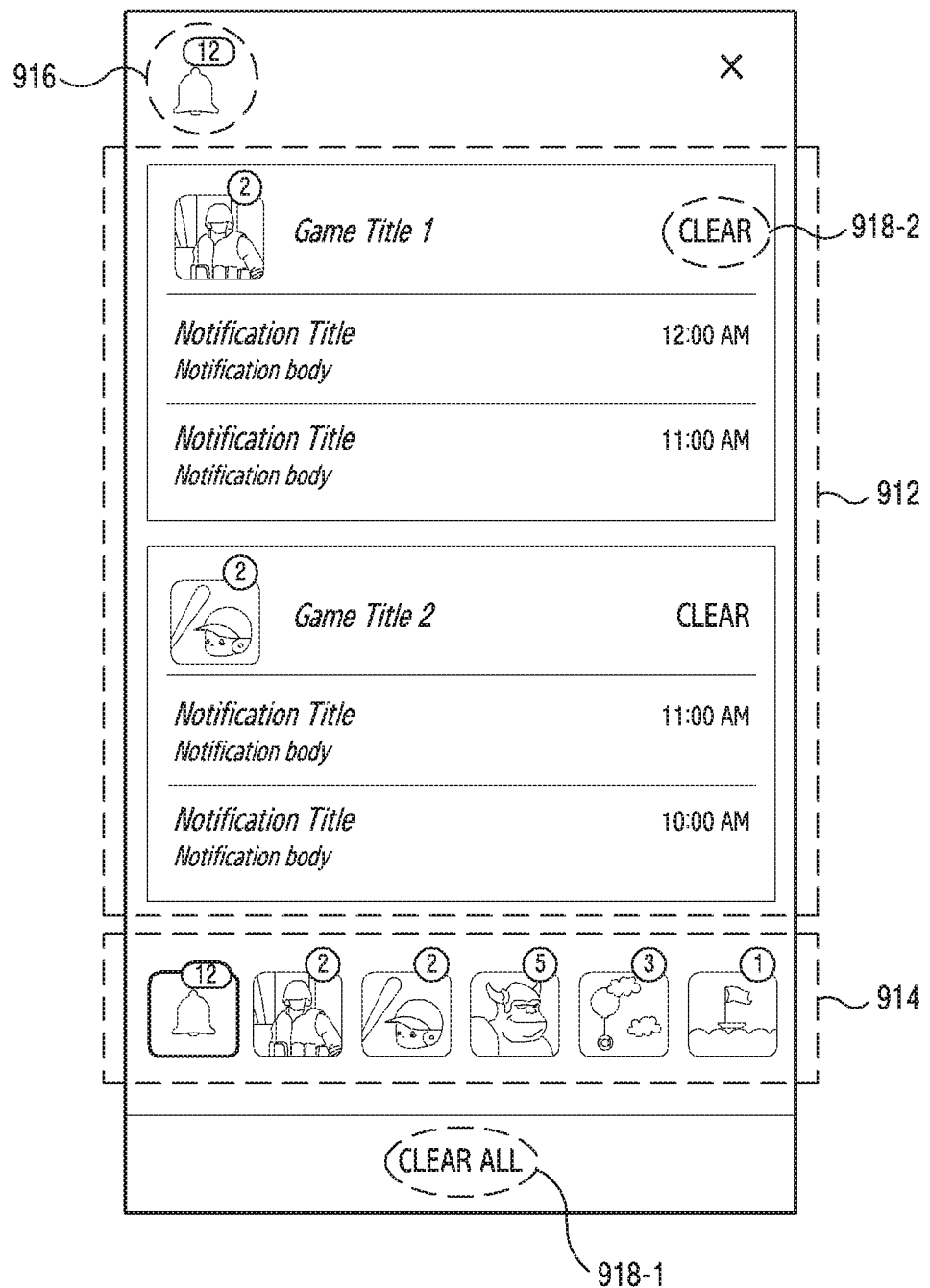
FIG. 9A and FIG. 9B illustrate exemplary screen configurations for displaying notifications by an electronic device according to various embodiments of the present disclosure.

For example, when a selected notification icon corresponds to multiple applications, the processor 120 may display notifications as illustrated in FIG. 9A through the display 160. Referring to FIG. 9A, notifications regarding respective applications are displayed in the first are 912, and notification icons are displayed in the second area 914. In the first area 912, notifications regarding respective applications are delimited such that the same can be distinguished, and the name of applications, the content of notifications, the time when notifications occur, and the like are displayed. In addition, information notifying of a selected notification icon is displayed in the third area 916. A "CLEAR ALL" button 918-1 is displayed to clear all notifications displayed in the first area 912, and a "CLEAR" button 918-2 is displayed to clear notifications with regard to respective applications.

Figure 9B:
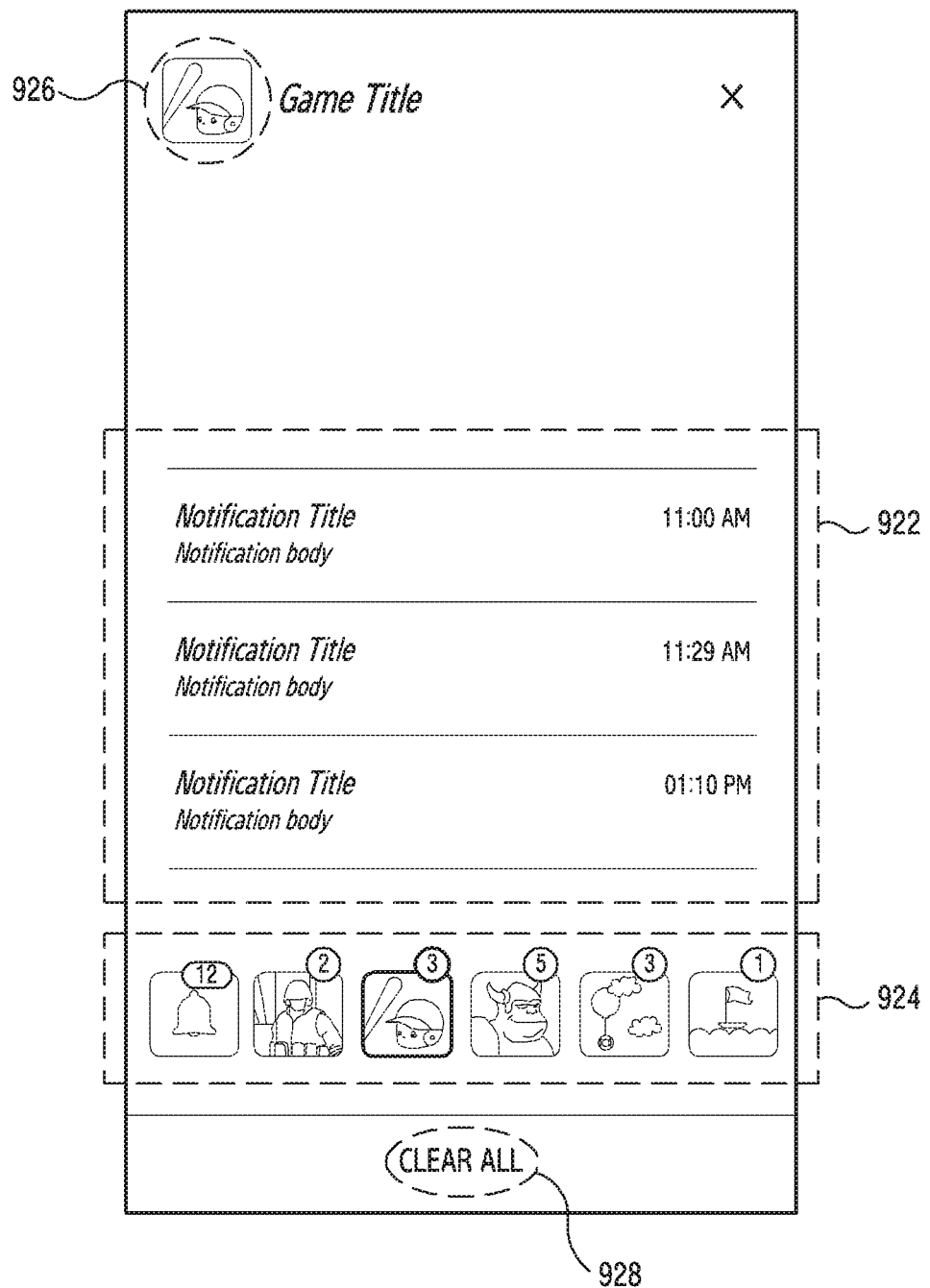

As another example, when a selected notification icon corresponds to one application, the processor 120 may display applications as illustrated in FIG. 9B through the display 160. Referring to FIG. 9B, notifications regarding applications are displayed in the first area 922, and notification icons are displayed in the second area 924. In addition, information notifying of a selected notification icon is displayed in the third area 926, and a "CLEAR ALL" button 928 is displayed to clear all notifications displayed in the first area 922.

According to the embodiments described with reference to FIG. 8, FIG. 9A, and FIG. 9B, notifications may be displayed. In other words, as in the case of the embodiment of FIG. 8, notifications may be categorized and displayed by an interface categorized according to the name of applications. Accordingly, the user may view and manage notifications for each application. In other words, notifications are arranged with regard to each application such that the user can distinguish the same from normal notifications and easily recognize whether or not the corresponding application needs to be executed. In addition, the number of notifications is displayed by using a badge such that the user can easily check which operation of the corresponding application has been completed, or which event has occurred without having to view the content of the notifications. In addition, notifications are stored and are deleted with regard to each application such that the user can store notifications of applications that do not need to be executed immediately, and can delete unnecessary notifications with regard to each application. In connection with displaying notifications, the electronic device may parse and categorize notifications and may provide a more intuitive interface according to the result of parsing and categorization. An exemplary procedure of displaying notifications will now be described with reference to FIG. 10.

Figure 10:
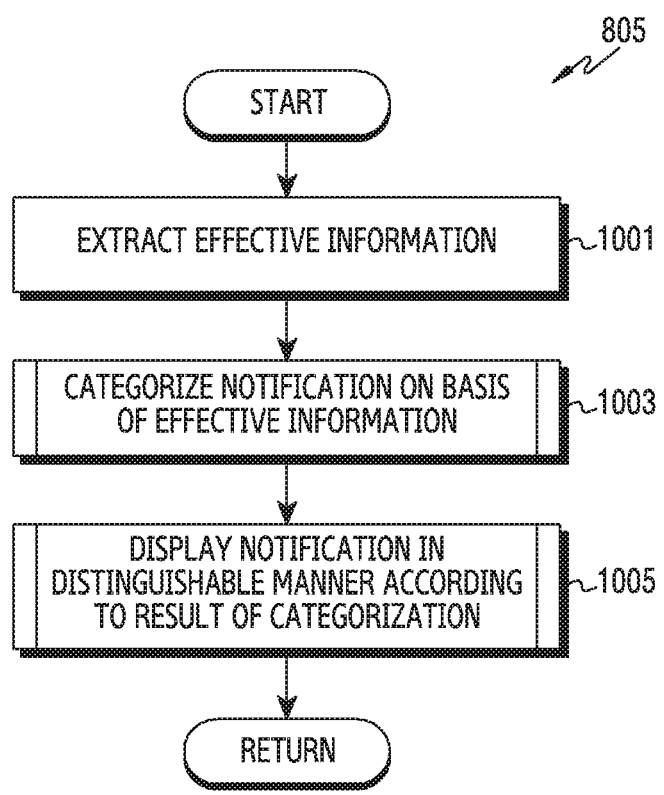
FIG. 10 is a flowchart for displaying notifications on the basis of effective information by an electronic device according to various embodiments of the present disclosure.

FIG. 10 is a flowchart for displaying notifications on the basis of effective information by an electronic device according to various embodiments of the present disclosure. FIG. 10 illustrates an exemplary operating method of an electronic device 101.

Referring to FIG. 10, in operation 1001, the electronic device extracts effective information. The processor 120 may extract effective information for notification categorization from a notification. The manner of extracting effective information may be determined according to a parsing pattern, and the parsing pattern may be defined in advance, designated by the user, or provided from an external device (for example, the application server 106-2).

Subsequently, in operation 1003, the electronic device categorizes notifications on the basis of the effective information. For example, the effective information may be one selected from the event period, a designated keyword, and the purpose of the notification. Similar to extraction of the effective information, categorization of notifications may also be performed according to the parsing pattern. For example, categorization may be performed on the basis of whether or not an event is currently proceeding, whether or not a designated keyword is included, or whether or not the purpose of the notification conforms to a predetermined purpose (for example, update).

Thereafter, in operation 1005, the electronic device displays notifications such that the same can be distinguished according to the result of categorization. That is, the electronic device categorizes notifications into multiple groups and assigns at least one visual effect thereto, thereby displaying the same in a distinguishable manner In this regard, different visual effects may be assigned to two or more groups.

According to the embodiment described with reference to FIG. 11, notifications may be categorized and displayed in a distinguishable manner Accordingly, the user can recognize the attribute of notifications intuitively and more easily. Hereinafter, more detailed embodiments for categorizing notifications will be described with reference to FIG. 11 to FIG. 16.

Figure 11:
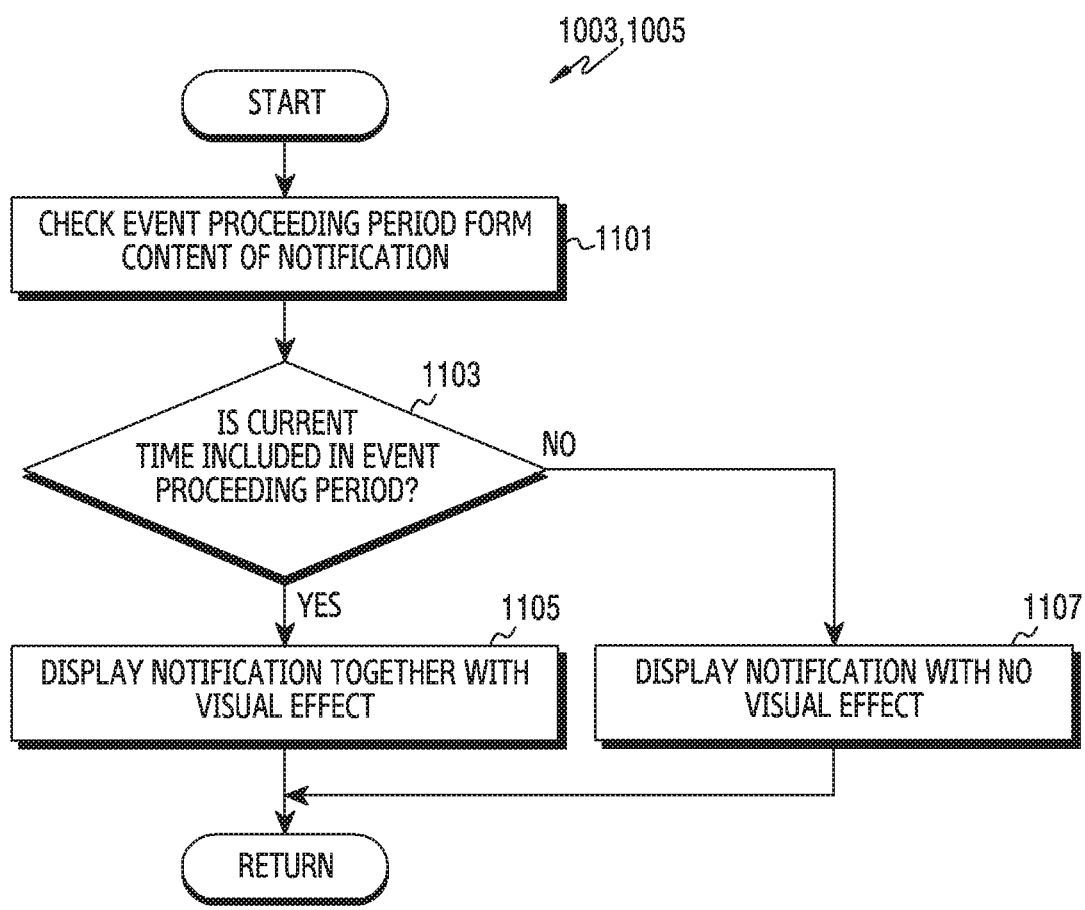
FIG. 11 is a flowchart for displaying notifications on the basis of event-related information by an electronic device according to various embodiments of the present disclosure.
Figure 12A:
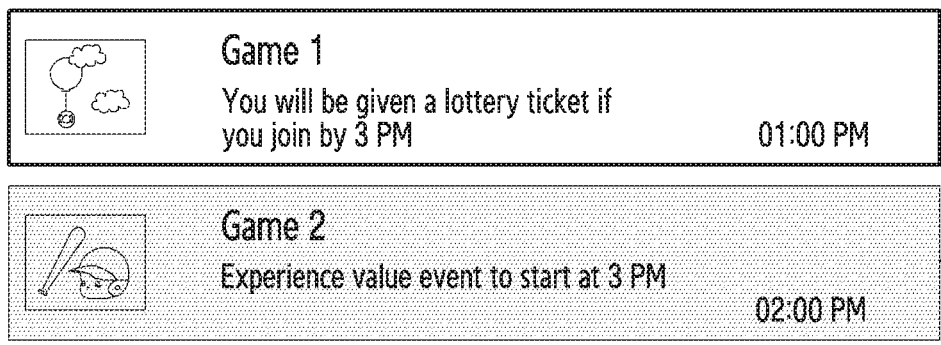
FIG. 12A and FIG. 12B illustrate exemplary screen configurations for displaying notifications on the basis of event-related information by an electronic device according to various embodiments of the present disclosure.
Figure 12B:
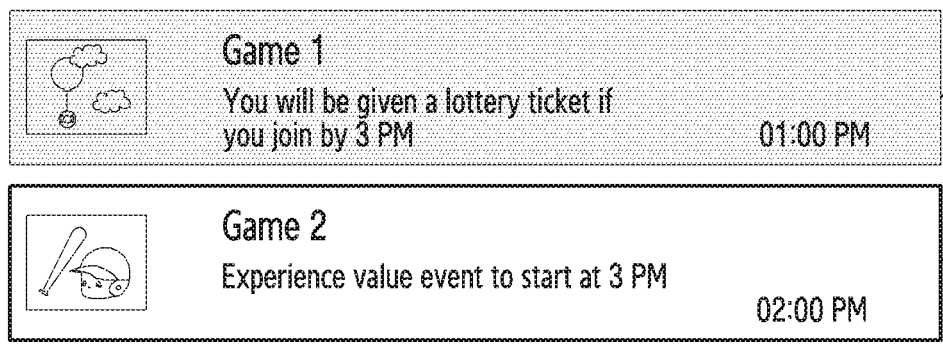

FIG. 11 is a flowchart for displaying notifications on the basis of event-related information by an electronic device according to various embodiments of the present disclosure. FIG. 11 illustrates an exemplary procedure of comparing time information, a word (for example, "until" or "from") used by a notification, and the like with the current time, categorizing whether or not an event notified of by the corresponding notification is currently proceeding, and distinguishing the corresponding notification by using a visual effect (for example, change of color and edge). FIG. 11 illustrates an exemplary operating method of an electronic device 101.

Referring to FIG. 11, in operation 1101, the electronic device checks the event proceeding period from the content of a notification. That is, the displayed notification notifies particulars related to an event, and whether or not the same is related to the event may be determined by a word matching test. That is, the processor 120 determines that a notification is related to an event according to whether or not the same includes a word for identifying the event, and checks the event proceeding period, that is, the event starting time and the event ending time, on the basis of date/time information, occurrence date/time, and the like included in the content of the notification.

Subsequently, in operation 1103, the electronic device determines whether or not the current time is included in the event proceeding period. In other words, the processor 120 determines whether or not an event is currently proceeding, that is, whether or not it is possible to participate in the current event.

If the current time is included in the event proceeding period, the electronic device displays a notification together with a visual effect in operation 1105. That is, the processor 120 assigns a visual effect to the notification in order to inform that it is possible to participate in the current event. For example, as in FIG. 12A, the processor 120 assigns a visual effect of highlighting the edge of the first notification 1202 so as to distinguish between the first notification 1202, which notifies of an event that can be currently participated in, and the second notification 1204 which notifies of an event that cannot be currently participated in. In this regard, whether or not an event can be participated in varies depending on the elapse of the current time, meaning that even the same notifications may have different visual effects as the current time elapses. That is, as in FIG. 12B, the processor 120 may assign a visual effect to the second notification 1204 as the current time elapses. On the contrary, if the current time is not included in the event proceeding period, the electronic device displays notifications with no visual effects.

In the embodiment described with reference to FIG. 11, a visual effect is assigned to a notification notifying of an event that can be currently participated in. However, according to another embodiment, a visual effect may be assigned to a notification notifying an event that cannot be currently participated in. For example, as in FIG. 12A, a visual effect may be assigned to the second notification 1204 so as to add shading thereto. In addition, as in FIG. 12B, a visual effect may be assigned to the first notification 1202 so as to add shading thereto. According to still another embodiment, different visual effects may be assigned both to a notification notifying of an event that can be currently participated in and to a notification notifying of an event that cannot be currently participated in.

Figure 13:
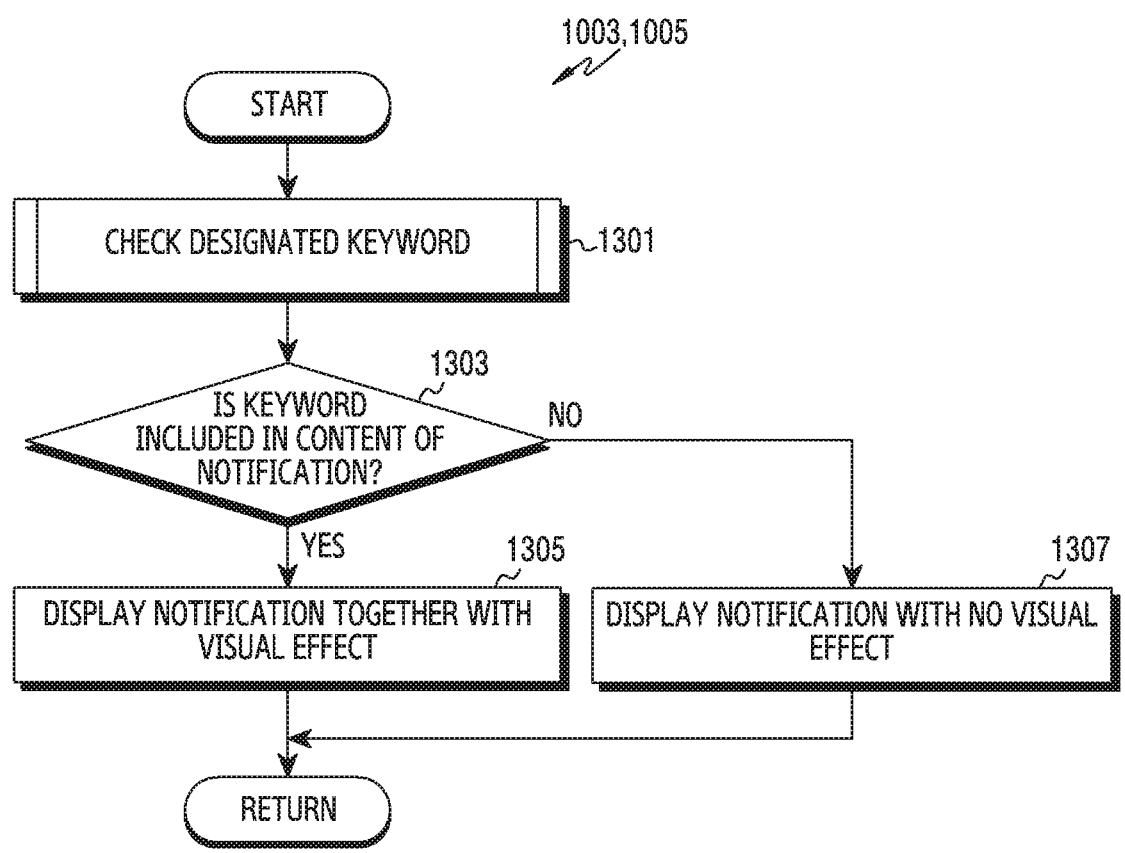
FIG. 13 is a flowchart for displaying notifications on the basis of a keyword by an electronic device according to various embodiments of the present disclosure.

FIG. 13 is a flowchart for displaying notifications on the basis of a keyword by an electronic device according to various embodiments of the present disclosure. FIG. 13 illustrates an exemplary procedure of categorizing important notifications and non-important notifications by using a designated keyword, distinguishing the priority, and displaying notifications such that the same are distinguished according to the priority. FIG. 13 illustrates an exemplary operating method of an electronic device 101.

Referring to FIG. 13, in operation 1301, the electronic device checks a designated keyword. The keyword is effective information regarding notifications, and may be designed by the user, provided from an external server (for example, the application server 106-2), or designated by a predefined algorithm.

Subsequently, in operation 1303, the electronic device checks whether or not the keyword is included in the content of a notification. That is, the processor 120 compares the content of the notification with the keyword. In this regard, the processor 120 may examine one keyword or multiple keywords. When multiple keywords are examined, the processor 120 may determine whether or not all of the multiple keywords are included, or may determine whether or not at least one of the multiple keywords is included.

Figure 14A:
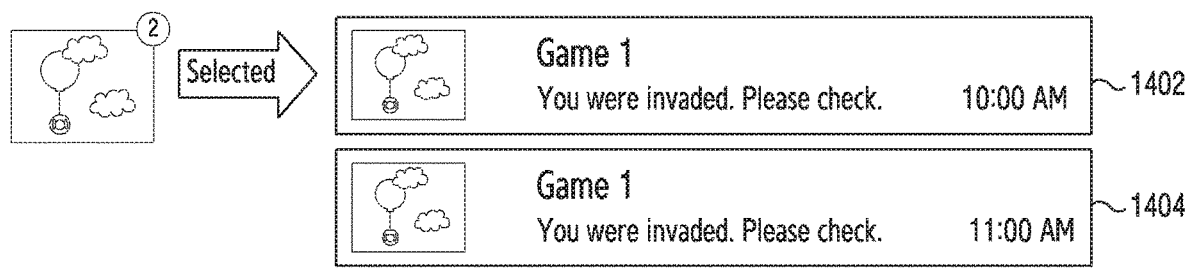
FIG. 14A and FIG. 14B illustrate exemplary screen configurations for displaying notifications on the basis of a keyword by an electronic device according to various embodiments of the present disclosure.
Figure 14B:
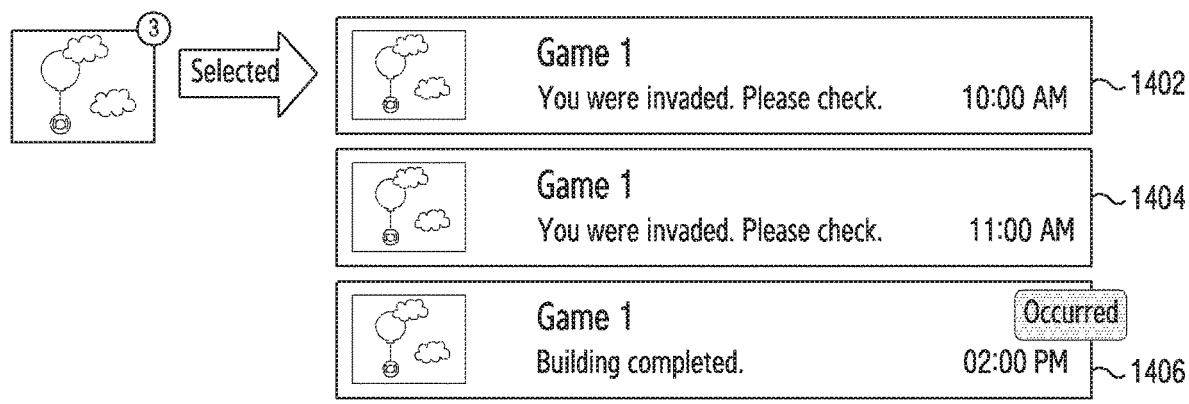

If the keyword is included in the content of a notification, the electronic device displays the notification together with a visual effect in operation 1305. That is, the processor 120 assigns a visual effect to the notification in order to inform of occurrence of the notification, the content of which includes the designated keyword. On the contrary, if the keyword is not included in the content of a notification, the electronic device displays the notification with no visual effect in operation 1307. For example, when the keyword is not included in the content of the notification, the processor 120 displays the notification with no additional visual effect as in the case of the first notification 1402 and the second notification 1404 illustrated in FIG. 14A and FIG. 14B. When the keyword is included in the content of the notification, the processor 120 may assign a visual effect as in the case of the third notification 1406 illustrated in FIG. 14B. Referring to FIG. 14B, the third notification 1406 includes a designated keyword "completed" and is accordingly assigned a visual effect for providing additional information including the word "occurred".

In the embodiment described with reference to FIG. 13, a visual effect is assigned to a notification including a keyword. However, according to another embodiment, a visual effect (for example, color change or shading) may be assigned to a notification including no keyword. According to still another embodiment, different visual effects may be assigned both to a notification including a keyword and to a notification including no keyword.

According to the embodiment illustrated with reference to FIG. 13, a visual effect is assigned to a notification according to whether or not the same includes a keyword. In addition thereto, according to an embodiment of the present disclosure, a visual effect may be assigned not only to a notification, but to a notification icon. Referring to FIG. 14A, there exists no notification including a keyword. Accordingly, a visual effect is assigned to the notification icon so as to shade the same in a situation as in FIG. 14A. On the contrary, when there exists a notification including a keyword as in FIG. 14B, the notification icon may be displayed clearly with no visual effect. According to another embodiment, when there exists a notification including a keyword, the notification icon may be assigned a visual effect (for example, color change or edge highlighting). Accordingly, the user can easily recognize whether or not a notification including a keyword has occurred, solely on the basis of the notification icon, without having to view the notification.

Figure 15:
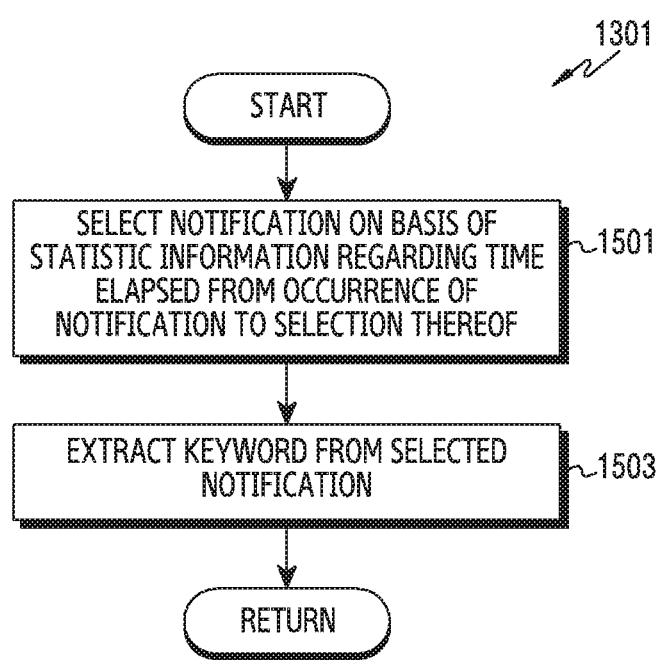
FIG. 15 is a flowchart for determining a keyword by an electronic device according to various embodiments of the present disclosure.

FIG. 15 is a flowchart for determining a keyword by an electronic device according to various embodiments of the present disclosure. FIG. 15 illustrates an exemplary operating method of an electronic device 101.

Referring to FIG. 15, in operation 1501, the electronic device selects at least one notification on the basis of statistic information regarding the time elapsed from occurrence of a notification to selection thereof. That is, the processor 120 measures the time elapsed from occurrence of a notification to selection thereof by the user, and stores the elapsed time in the memory 130. When information regarding the elapsed time related to notification selections is accumulated, the processor 120 may sort notifications in the ascending or descending order of the elapsed time, and may select notifications, the elapsed time of which is below a predetermined threshold time, or a predetermined number of notifications having a short elapsed time.

Subsequently, in operation 1503, the electronic device extracts a keyword from the selected notifications. For example, the processor 120 may retrieve a common word shared by the selected notifications, or may retrieve words having similar meanings. The extracted keyword is designated as effective information. Alternatively, when only one notification is selected, the processor 120 may exclude normal words and may extract, as the keyword, a core word that is characterized by the content of the notification.

According to the embodiment described with reference to FIG. 15, the keyword is determined on the basis of the time elapsed from occurrence of a notification to selection thereof. However, according to another embodiment, the keyword may be provided from an external server (for example, the application server 106-2). In this case, the external server may collect statistic information regarding selection of notifications by users of the corresponding application, may determine notifications that are selected within a comparatively short time according to the statistic information, and may provide a word included in the corresponding notification as the keyword.

Figure 16:
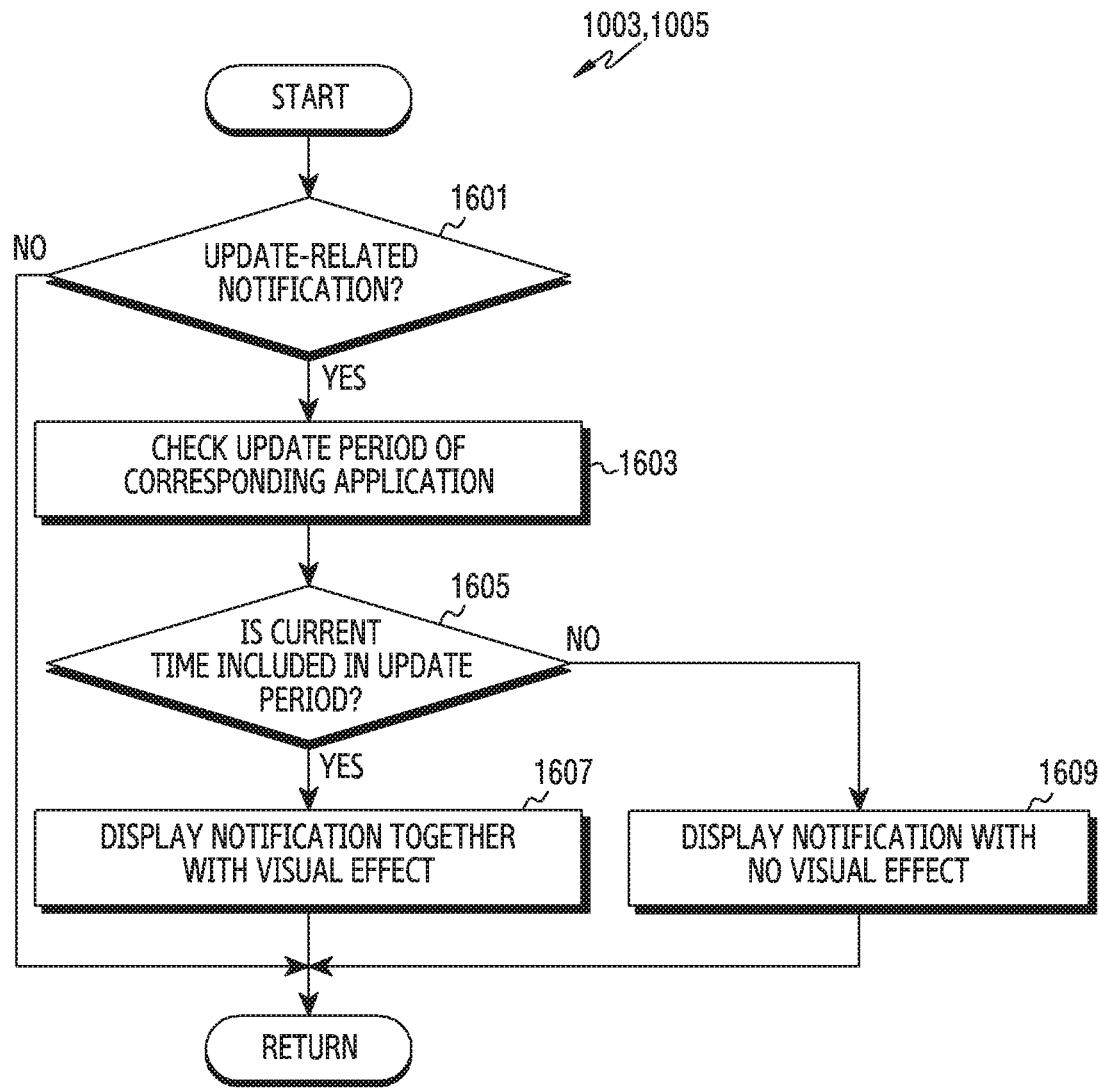
FIG. 16 is a flowchart for displaying notifications on the basis of whether or not the same are related to an update by an electronic device according to various embodiments of the present disclosure.

FIG. 16 is a flowchart for displaying notifications on the basis of whether or not the same are related to an update by an electronic device according to various embodiments of the present disclosure. FIG. 16 illustrates an exemplary procedure of notifying of whether or not execution of an application through a corresponding notification will be followed by a large amount of data consumption, on the basis of the correlation with an update, by using a visual effect (for example, a color warning) before joining the game. FIG. 16 illustrates an exemplary operating method of an electronic device 101.

Referring to FIG. 16, in operation 1601, the electronic device checks whether or not an update-related notification occurs. The update-related notification may be checked by retrieving a word from the notification content.

When an update-related notification occurs, the electronic device checks the update period of the corresponding application in operation 1603. For example, the processor 120 may check the update period from the content of the notification. Alternatively, as another example, the processor 120 may check the update period through signaling with an external server (for example, the application server 106-2).

Thereafter, the electronic device determines whether or not the current time is included in the update period in operation 1605. In other words, the processor 120 determines whether or not an update will proceed if the corresponding application is currently executed. To this end, the processor 120 may again check the current version of the application, that is, whether or not the update has been completed.

If the current time is included in the update period, the electronic device displays the notification together with a visual effect in operation 1607. On the contrary, if the current time is not included in the update period, the electronic device displays the notification with no visual effect in operation 1609. That is, if the current time is included in the update period, data communication for an update will be performed when the application is executed, and, considering this, the processor 120 may assign a visual effect (for example, displaying a warning message) so as to inform that data communication is necessary.

In the embodiment described with reference to FIG. 16, a visual effect is assigned if the current time is included in the update period. However, according to another embodiment, a visual effect may be assigned when the current time is not included in the update period, and the visual effect may be removed when the current time is included in the update period. That is, the visual effect may be assigned to a different object as long as it is possible to distinguish whether or not the current time is included in the update period.

Figure 17:
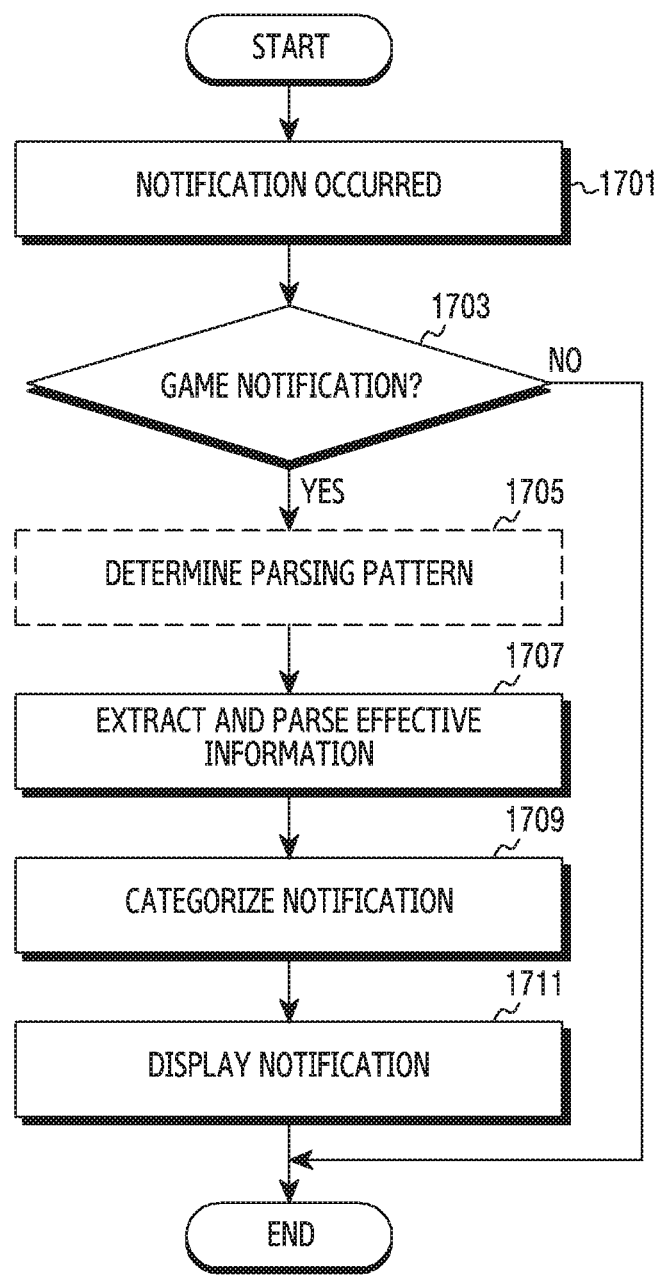
FIG. 17 is a flowchart for parsing, categorizing, and displaying notifications by an electronic device according to various embodiments of the present disclosure.

FIG. 17 is a flowchart for parsing, categorizing, and displaying notifications by an electronic device according to various embodiments of the present disclosure. FIG. 17 illustrates an exemplary operating method of an electronic device 101. FIG. 17 illustrates an embodiment for managing notifications regarding game applications. In FIG. 17, operations marked by dotted lines may be omitted according to an embodiment.

Referring to FIG. 17, in operation 1701, the electronic device senses occurrence of a notification. Subsequently, in operation 1703, the electronic device determines whether or not the notification that has occurred is related to a game application. For example, the processor 120 may confirm whether or not the notification occurred is a game notification by using a game service 354. The game service 354 can confirm whether or not the application corresponding to the notification occurred is a game application by using a game information manager 356. According to another embodiment, the processor 120 may receive information regarding the application from an external server (for example, the market server 106-1). If the application is not a game application, the processor 120 ends the present procedure.

On the contrary, if the application is a game application, the electronic device determines a parsing pattern in operation 1705. The parsing pattern may be determined on the basis of information received from the market server 106-1. Alternatively, the parsing pattern may be determined in advance. Subsequently, in operation 1707, the electronic device extracts effective information by parsing the content of the notification. And, in operation 1709, the electronic device categorizes the notification on the basis of the extracted effective information. Then, in operation 1711, the electronic device displays the categorized notification.

According to various embodiments described above, a visual effect may be assigned to a notification icon and to a notification. This enables the user to experience a more intuitive interface. Moreover, according to various embodiments, a visual effect may be assigned to an execution icon. For example, a visual effect assigned to an execution icon may be used to express information regarding the situation (for example, application update or service quality degradation) that will occur when the corresponding application is executed. An embodiment for assigning a visual effect to an execution icon will now be described with reference to FIG. 18.

Figure 18:
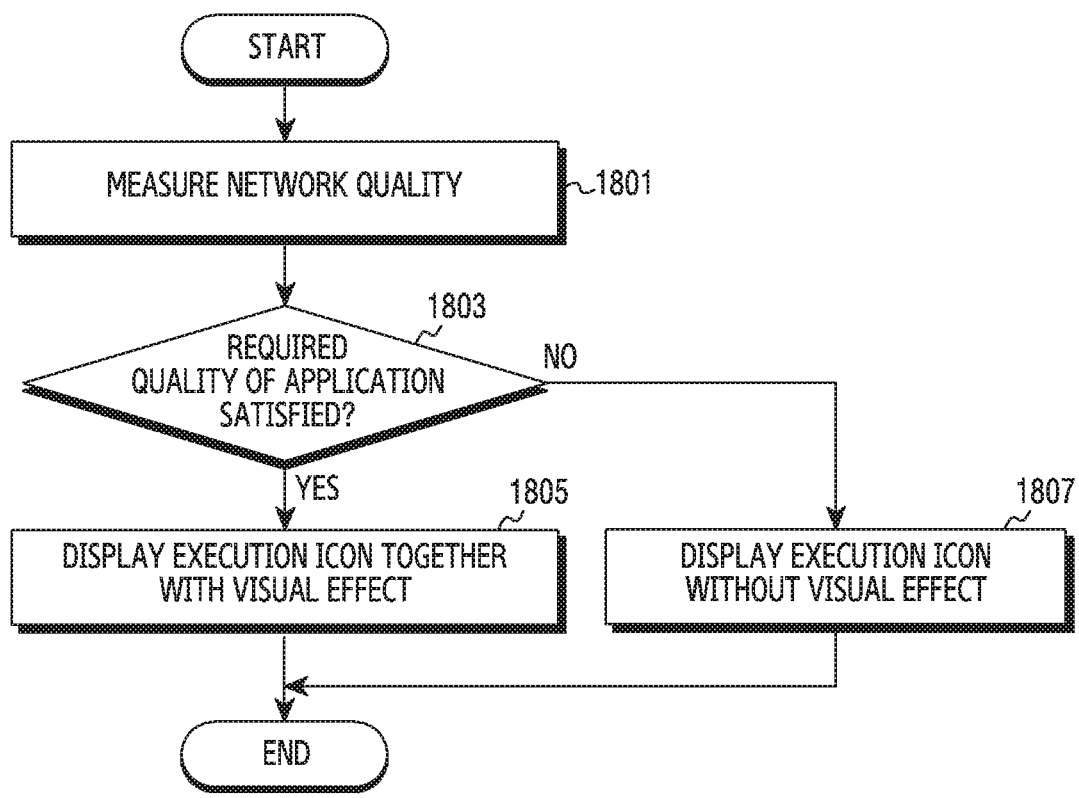
FIG. 18 is a flowchart for displaying an execution icon by an electronic device according to various embodiments of the present disclosure.

FIG. 18 is a flowchart for displaying an execution icon by an electronic device according to various embodiments of the present disclosure. FIG. 18 illustrates an exemplary procedure of providing information regarding an influence exerted on an application according to a network quality. FIG. 18 illustrates an exemplary operating method of an electronic device 101.

Referring to FIG. 18, in operation 1801, the electronic device measures the network quality. In this regard, the network quality may be measured on the basis of the signal intensity, the type of a connectable network, the data error ratio, and the maximum transmission rate. That is, the processor 120 may collect necessary parameters through the communication interface 170 and may measure the network quality on the basis of the parameters.

Subsequently, in operation 1803, the electronic device checks whether or not the required quality of the application is satisfied. Network-related requirements, such as the required transmission rate, may differ depending on the application. For example, in the case of an application requiring a high degree of real-time interaction, a high transmission rate may be required. Therefore, the processor 120 may determine whether or not the application can be executed efficiently on the basis of the current network quality.

If the required quality is satisfied, the electronic device displays an execution icon together with a visual effect in operation 1805. In other words, the processor 120 assigns a visual effect to the execution icon so as to inform that, when executed, the network situation will not interfere with service provision. On the contrary, if the required quality is not satisfied, the electronic device displays the execution icon with no visual effect in operation 1807.

In the embodiment of FIG. 18, a visual effect is assigned when the required quality is satisfied. However, according to another embodiment, a visual effect (for example, a warning about a predictable service disruption) may be assigned when the required quality is not satisfied. According to still another embodiment, different visual effects (for example, displaying a level corresponding to a predicted service quality) may be assigned both when the required quality is satisfied and when the required quality is not satisfied.

In the embodiment of FIG. 18, information regarding the network quality is expressed through an execution icon. According to another embodiment, information regarding the network quality may be expressed through a notification or a notification icon. In this case, for example, the electronic device may generate a notification that informs that the current network quality satisfies or does not satisfies the required quality of the application, and may display occurrence of the notification through a notification icon.

According to various embodiments described above, a visual effect may be assigned to an execution icon, a notification icon, and a notification. This enables the user to experience a more intuitive interface. Moreover, according to various embodiments, an execution icon may be generated by the electronic device. A notification launcher 386 according to various embodiments is not only for the purpose of simply executing applications, but also is a type of content which expresses the condition of application intuitively, and which enables an easy access to applications. To this end, the notification launcher 386 may provide an execution icon having the same ratio as that of the screen on which applications are executed. Various embodiments for generating an execution icon will now be described with reference to FIG. 19 to FIG. 22.

Figure 19:
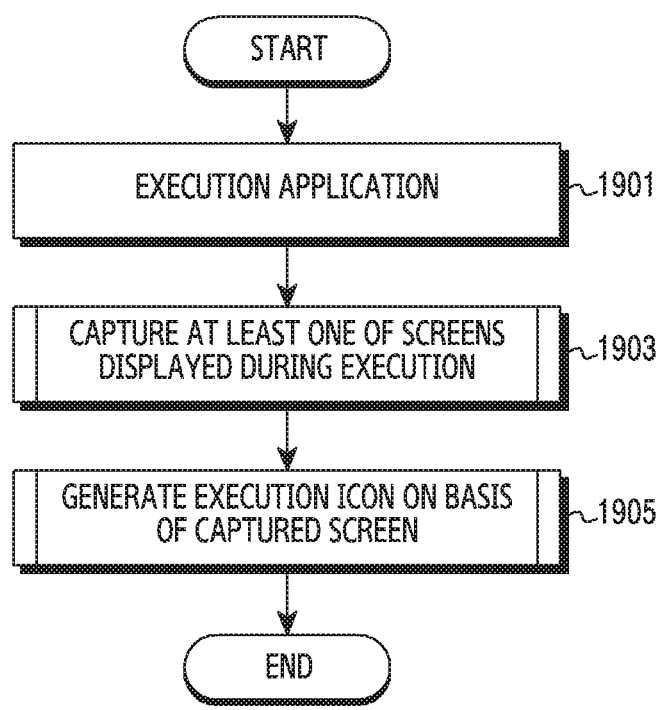
FIG. 19 is a flowchart for generating an icon by an electronic device according to various embodiments of the present disclosure.

FIG. 19 is a flowchart for generating an icon by an electronic device according to various embodiments of the present disclosure. FIG. 19 illustrates an exemplary operating method of an electronic device 101.

Referring to FIG. 19, in operation 1901, the electronic device executes an application. The application may be executed by selecting an execution icon according to various embodiments of the present disclosure, or may be executed by selecting a normal icon. As the application is executed, the processor 120 performs a calculation according to instructions for executing the application. Accordingly, the processor 120 displays application execution screens through the display 160.

Subsequently, in operation 1903, the electronic device captures at least one of screens displayed while the application is executed. In this case, according to a specific embodiment of icon generation, multiple screens may be captured, and the multiple screens may be continuous or discontinuous. For example, according to an embodiment, the processor 120 may acquire a still image by periodically capturing the screen at a predetermined time (for example, during the initial loading or during splash image generation) or for a predetermined duration. According to another embodiment, the processor 120 may acquire moving images by capturing continuous screens.

Thereafter, in operation 1905, the electronic device generates an execution icon on the basis of at least one captured screen. Specifically, the processor 120 modifies the at least one captured screen or a different image obtained on the basis of the at least on captured screen, and maps the modified image to the execution icon. In other words, the processor 120 maps the modified image and an application execution command.

According to the embodiment described with reference to FIG. 19, an execution icon may be generated. This enables the user to use execution icons having various sizes and shapes. Specifically, a large image having a ratio identical or similar to that of the execution screen is used to express an icon such that the content regarding the application can be delivered to the user in a more detailed manner In addition, by using an icon made of a large image, an additional gesture regarding the icon can be utilized. According to an embodiment, an image used as an execution icon may be selected by retrieving the same from an external database, and the detailed procedure will now be described with reference to FIG. 20.

Figure 20:
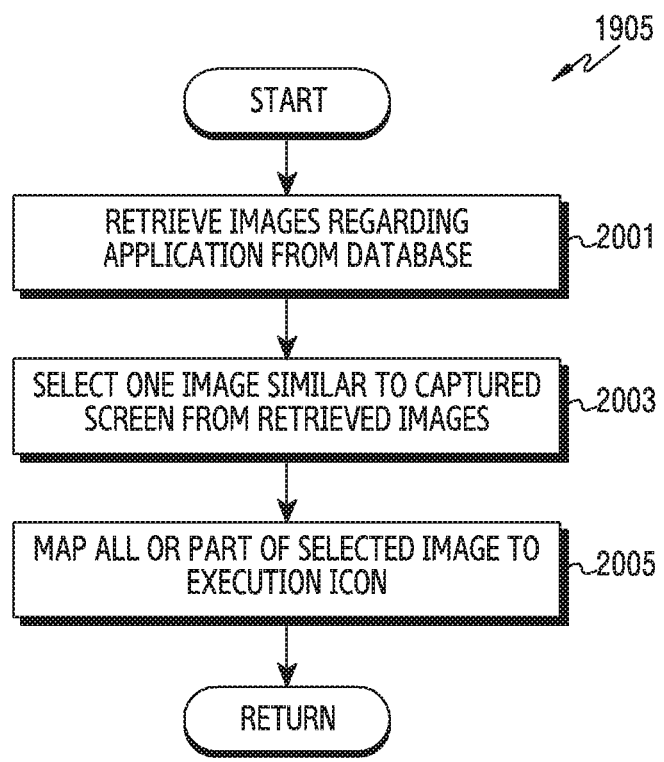
FIG. 20 is a flowchart for generating an icon by using a retrieved image by an electronic device according to various embodiments of the present disclosure.

FIG. 20 is a flowchart for generating an icon by using a retrieved image by an electronic device according to various embodiments of the present disclosure. FIG. 20 illustrates an exemplary operating method of an electronic device 101.

Referring to FIG. 20, in operation 2001, the electronic device retrieves images regarding an application from a database. In this regard, the database is positioned outside, and the processor 120 may access a search site through the communication interface 170 so as to retrieve images. To this end, the processor 120 may check information regarding the application (for example, the name and the manufacturer) through the package name and may retrieve images by using the checked information.

Subsequently, in operation 2003, the electronic device selects an image similar to the captured screen from the retrieved images. In this regard, the captured screen includes at least one screen captured during the initial loading or when a splash image is generated. In this regard, the similarity of images may be determined on the basis of at least one selected from the color of images and the structure of images. In this case, according to an embodiment, the processor 120 may parse images and may select one similar image on the basis of the parsing result. According to another embodiment, the processor 120 may display retrieved images through the display 160 and may request the user to make a selection such that the user can select one similar image. According to still another embodiment, the processor 120 may primarily select multiple images according to the parsing result and may secondarily request the user to select one from the selected images.

Thereafter, in operation 2005, the electronic device maps all or part of the selected image to an execution icon. That is, the image used as the execution icon may correspond to all or part of the selected image. In the case of a part of the image, the processor 120 crops the selected image. In this regard, according to the specific embodiment, the shape of the cropped image may be variously defined, such as a square, a circle, a rectangle, or a rhombus.

According to the embodiment of FIG. 20, an image obtained through a search is mapped to an execution icon. However, according to another embodiment, a screen captured during execution may be used as an execution icon. In this case, the processor 120 may omit operations 2001 and 2003 of FIG. 20 and may map all or part of the captured screen to an execution icon in operation 2005.

According to the embodiment described with reference to FIG. 20, an image mapped to an execution icon through a web search may be selected. This enables the user to use an execution icon generated from a high-quality image, the resolution of which is higher than that of the captured screen. According to another embodiment, the image used as the execution icon may be extracted from captured screens, and a detailed procedure therefor will now be described with reference to FIG. 21.

Figure 21:
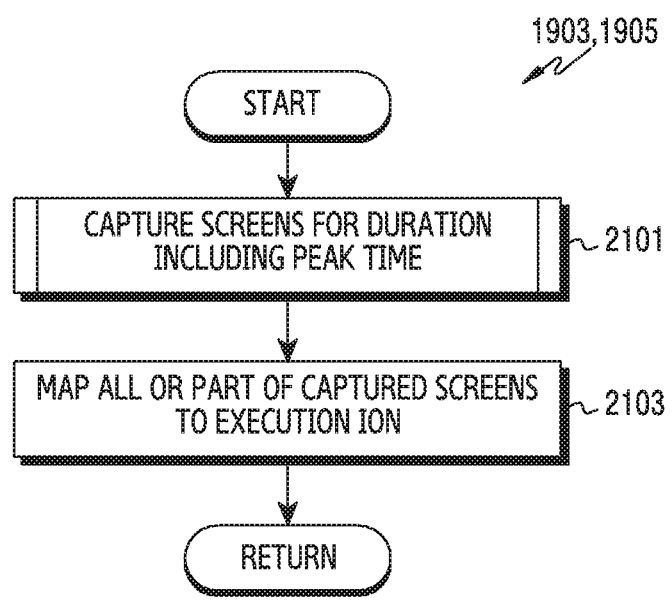
FIG. 21 is a flowchart for generating an icon by using a captured screen by an electronic device according to various embodiments of the present disclosure.

FIG. 21 is a flowchart for generating an icon by using a captured screen by an electronic device according to various embodiments of the present disclosure. FIG. 21 illustrates an exemplary operating method of an electronic device 101.

Referring to FIG. 21, in operation 2101, the electronic device captures screens for a duration including a peak time while an application is executed. In this regard, the peak time refers to a time deemed to exhibit characteristics of the application or to have a high degree of user concentration. In this regard, according to various embodiments, the peak time may be positioned at the starting part, middle part, or ending part of the duration for which screen capture is performed.

Subsequently, in operation 2103, the electronic device maps all or part of captured screens to an execution icon. For example, according to an embodiment, the processor 120 may map a moving image including multiple screens among the captured screens to the execution icon. According to another embodiment, the processor 120 may map a still image including one screen among the captured screens to the execution icon. In this case, additionally, the processor 120 may crop the moving image or still image in conformity with the shape of the execution icon.

According to the embodiment described with reference to FIG. 21, an execution icon may be generated from a screen captured at the peak time. A detailed embodiment for capturing the screen for the duration including the peak time will now be described with reference to FIG. 22.

Figure 22:
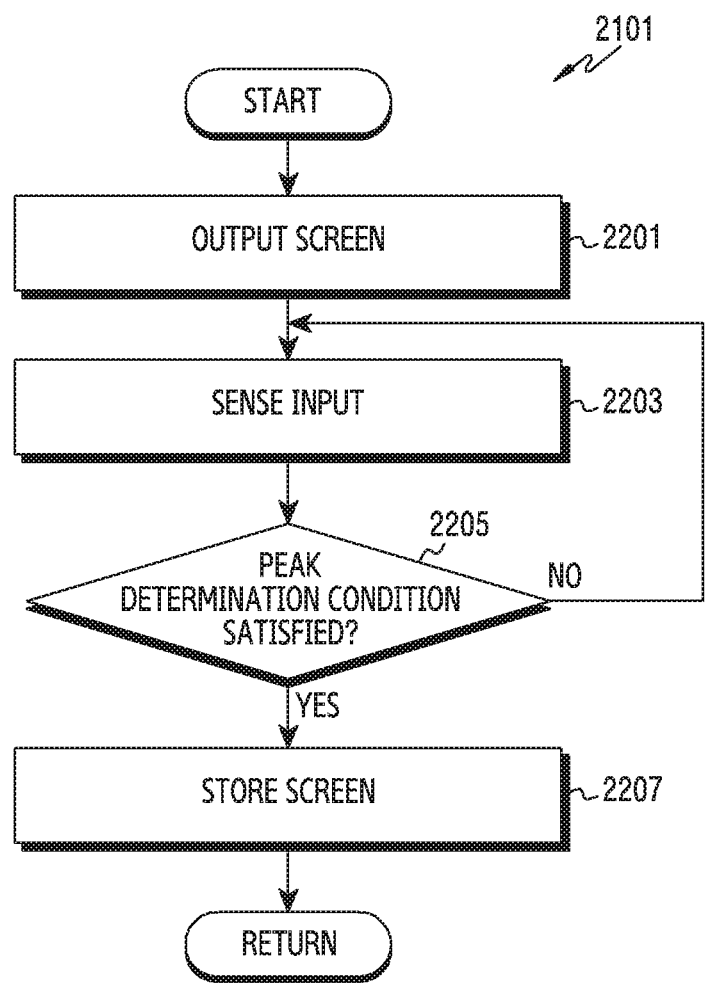
FIG. 22 is a flowchart for capturing a screen by an electronic device according to various embodiments of the present disclosure.

FIG. 22 is a flowchart for capturing a screen by an electronic device according to various embodiments of the present disclosure. FIG. 22 illustrates an exemplary operating method of an electronic device 101.

Referring to FIG. 22, in operation 2201, the electronic device outputs a screen following execution of an application. As an input is received from the user, the processor 120 may execute an application and may output a screen related to the executed application.

In operation 2203, the electronic device senses various inputs. For example, the processor 120 may receive at least one selected from information regarding the condition of the electronic device and information regarding the external situation. For example, the information regarding the condition of the electronic device may include application execution information and information regarding the inside of the application. For example, the information regarding the external situation of the electronic device may include at least one selected from the electronic device's reception information, the user's biometric input information which is information regarding the outside of the application, information regarding sounds generated by the user, and information regarding the user's movement. In addition, the information regarding the internal condition of the electronic device may include at least one selected from a touch input, a key input, FPS (frame per second) information, and chatting input information.

In operation 2205, the electronic device determines whether or not sensed input information satisfies a condition defined to determine the peak. According to an embodiment, when the sensed input information is touch input information, the processor 120 may determine whether or not the sensed input information satisfies the designated condition by confirming whether or not the number of touch inputs sensed for a unit time is equal to or larger than a designated number. According to another embodiment, when the sensed input information is input information regarding the user's biometric condition, the processor 120 may determine whether or not the sensed input information satisfies the designated condition by confirming whether or not the condition of the sensed biometric input information corresponds to a designated condition. For example, upon sensing biometric input information regarding the user's heartbeats, the processor 120 may determine whether or not the sensed input information satisfies the designated condition by confirming whether or not the number of heartbeats is equal to or larger than a designated number. According to another embodiment, upon sensing biometric input information regarding the user's pupil, the processor 120 may determine whether or not the sensed input information satisfies the designated condition by confirming whether or not the pupil size is equal to or larger than a designated size. According to another embodiment, when the sensed input information is input information regarding movement information, the processor 120 may determine whether or not the sensed input information satisfies the designated condition by confirming whether or not the sensed movement information is equal to or larger than a designated movement value. According to another embodiment, when the sensed input information is an input related FPS, the processor 120 may determine whether or not the sensed input information satisfies the designated condition by confirming whether or not the FPS value is equal to or lower than a designated value.

Thereafter, in operation 2207, the electronic device stores the screens. That is, the processor 120 stores screens for a duration including a peak time, which is the time at which a condition defined to determine a peak is satisfied. To this end, the processor 120 may continuously buffer screens before the peak time arrives, and may store the buffered screens within the corresponding duration when the peak time is determined.

Methods stated in claims and/or specifications according to various embodiments may be implemented by hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The software may be stored in the form of a volatile or a non-volatile storage device such as a Read Only Memory (ROM), a memory such as a Random Access Memory (RAM), memory chips, devices or integrated circuits, or an optical or magnetic readable medium such as a Compact Disc-ROM (CD-ROM), Digital Versatile Discs (DVDs), a magnetic disk, or a magnetic tape.

A storage device and a storage medium corresponds to embodiments of a program including instructions for performing embodiments or a machine-readable storage means suitable for storing programs when executed. Embodiments provide a program including a code for implementing the device or the method claimed in one of the claims of the specification and a machine-readable storage medium for storing the program. Further, the programs may be electrically transferred to a medium, such as a communication signal transferred through a wired or a wireless connection, and embodiments properly include the equivalents.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to specific embodiments thereof in the description of the present disclosure, it will be apparent that various changes and modifications may be made thereto without departing from the spirit and scope of the present disclosure. Therefore, the scope of the present disclosure should not be defined as being limited to the embodiments, but should be defined by the appended claims and equivalents thereof.

The invention claimed is:

1. An electronic device comprising:
a display; and
a processor operatively connected to the display, wherein the processor is configured to:
control the display to display at least one execution icon regarding at least one application in a first area,
when a notification regarding the at least one application occurs, control the display to display a notification icon for notifying of occurrence of the notification in a second area, and
in response to a user input to select the notification icon, control the display to display at least one notification of at least one application corresponding to the selected notification icon in the first area, instead of the at least one execution icon.

2. The electronic device of claim 1, wherein the processor is configured to control the display, when the notification icon is selected, to display at least one notification regarding at least one application corresponding to the notification icon.

3. The electronic device of claim 1, wherein the processor is configured to assign a visual effect to the at least one notification based on effective information extracted from content of the at least one notification.

4. The electronic device of claim 3, wherein the processor is configured to:
identify an event proceeding period from the content of the notification, and
assign the visual effect to the notification when the current time is included in the event proceeding period.

5. The electronic device of claim 4, wherein the processor is configured to:
identify a keyword designated to categorize notifications, and
assign the visual effect to the notification when the keyword is included in the content of the notification.

6. The electronic device of claim 4, wherein the processor is configured to:
identify whether or not a notification comprises content related to an update,
identify an update period of an application corresponding to the notification, and
assign a visual effect to a notification notifying of the update when the current time is included in the update period.

7. The electronic device of claim 1, wherein the notification icon indicates whether or not a designated keyword is included in content of at least one notification regarding at least one corresponding application.

8. The electronic device of claim 7, wherein the keyword is entered by a user or determined on the basis of an application usage pattern of the user.

9. The electronic device of claim 1, wherein the processor is configured to:
measure a network quality,
compare the network quality with a required quality of an application, and
assign a visual effect to an execution icon for the application on the basis of whether or not the network quality satisfies the required quality.

10. The electronic device of claim 1, wherein the at least one execution icon is generated based on a database search or screen capture during application execution.

11. An electronic device comprising:
a display; and
a processor operatively connected to the display, wherein the processor is configured to:
execute an application,
obtain input information including at least one of a condition of the electronic device and information regarding an external situation of the electronic device, while the application is executed,
determine a peak time based on the input information,
capture at least one screen displayed on the display on the peak time or for a duration including the peak time,
generate an execution icon of the application based on the at least one screen, and
control the display to display the execution icon.

12. The electronic device of claim 11, wherein the processor is configured to:
retrieve at least one image regarding the application from a database,
select one image from the at least one retrieved image based on the at least one captured screen, and
map all or part of the one image to the execution icon.

13. The electronic device of claim 11, wherein the processor is configured to map all or part of the at least one captured screen to the execution icon.

14. The electronic device of claim 11, further comprising:
a communication interface,
wherein the processor is configured to control the communication interface to transmit the execution icon to an external server.

15. A method of an electronic device, the method comprising:
displaying at least one execution icon regarding at least one application in a first area;
when a notification regarding the at least one application occurs, displaying a notification icon for notifying of occurrence of the notification in a second area: and
in response to a user input to select the notification icon, displaying at least one notification of at least one application corresponding to the selected notification icon in the first area, instead of the at least one execution icon.

16. The method of claim 15, further comprising:
when the notification icon is selected, displaying at least one notification regarding at least one application corresponding to the notification icon.

17. The method of claim 15, wherein the displaying of the at least one notification comprises assigning a visual effect to the at least one notification based on effective information extracted from content of the at least one notification.

18. The method of claim 17, wherein the displaying of the at least one notification comprises:
identifying an event proceeding period from the content of the notification, and
assigning the visual effect to the notification when the current time is included in the event proceeding period.

19. The method of claim 18, wherein the displaying of the at least one notification comprises:
identifying a keyword designated to categorize notifications, and
assigning the visual effect to the notification when the keyword is included in the content of the notification.

20. The method of claim 18, wherein the displaying of the at least one notification comprises:
identifying whether or not a notification comprises content related to an update,
identifying an update period of an application corresponding to the notification, and
assigning a visual effect to a notification notifying of the update when the current time is included in the update period.

* * * * *